(12) United States Patent
Nammi et al.

(10) Patent No.: US 9,031,018 B2
(45) Date of Patent: May 12, 2015

(54) METHODS SELECTING MODULATION/CODING SCHEMES MAPPED TO MULTIPLE MIMO LAYERS AND RELATED USER EQUIPMENT

(75) Inventors: Sairamesh Nammi, Stockholm (SE); Bo Göransson, Sollentuna (SE); Erik Larsson, Uppsala (SE); Johan Hultell, Solna (SE)

(73) Assignee: Telefonaktiebolaget L M Ericsson (publ.), Stockholm (SE)

( * ) Notice: Subject to any disclaimer, the term of this patent is extended or adjusted under 35 U.S.C. 154(b) by 255 days.

(21) Appl. No.: 13/586,582

(22) Filed: Aug. 15, 2012

(65) Prior Publication Data

US 2013/0121269 A1    May 16, 2013

Related U.S. Application Data

(60) Provisional application No. 61/559,872, filed on Nov. 15, 2011.

(51) Int. Cl.
*H04W 4/00*      (2009.01)
*H04L 25/03*     (2006.01)
*H04W 28/06*     (2009.01)

(52) U.S. Cl.
CPC ......... *H04L 25/03343* (2013.01); *H04W 28/06* (2013.01)

(58) Field of Classification Search
CPC ....................................... H04B 7/0621–7/0634
See application file for complete search history.

(56) References Cited

U.S. PATENT DOCUMENTS

2009/0046800 A1* 2/2009 Xu et al. .................. 375/267
2013/0329594 A1* 12/2013 Davydov et al. .......... 370/252

OTHER PUBLICATIONS

Ericsson, "4-branch MIMO for HSDPA", 3GPP TSG RAN WG1 Meeting #65, Barcelona, Spain, May 9-13, 2011, 17 Pages.
Ericsson, "New WI: Four Branch MIMO transmission for HSDPA", 3GPP TSG-RAN meeting #53, Fukuoka, Japan, Sep. 13-16, 2011, 9 Pages.
Ericsson, ST-Ericsson, "4×4 DL MIMO HS-DPCCH design", 3GPP TSG RAN WG1 Meeting #66bis, Zhuhai, P.R. China, Oct. 10-14, 2011, 6 Pages.

(Continued)

*Primary Examiner* — Chi H Pham
*Assistant Examiner* — Fahmida Chowdhury
(74) *Attorney, Agent, or Firm* — Myers Bigel Sibley & Sajovec, P.A.

(57) ABSTRACT

A method of operating a user equipment communicating with a base station of a radio access network may include selecting a multiple-input-multiple-output, MIMO, rank and a MIMO precoding entity from a codebook of MIMO precoding entities for a downlink communication from the base station to the user equipment. A modulation/coding scheme to be mapped to first and second MIMO layers of the downlink communication may be selected using the MIMO precoding entity. Channel quality information may be communicated identifying the MIMO precoding entity and the modulation/coding scheme from the user equipment to the base station. Related user equipment nodes are also discussed.

20 Claims, 18 Drawing Sheets

(56) References Cited

OTHER PUBLICATIONS

Ericsson, ST-Ericsson, "Data Bundling in a 2 codeword MIMO System", 3GPP TSG-RAN WG1 #68, Dresden, Germany, Feb. 6-10, 2012, 9 Pages.

Ericsson, ST-Ericsson, "Number of supported codewords for 4-Branch MIMO", 3GPP TSG RAN WG1 Meeting #67, San Francisco, USA, Nov. 14-18, 2011, 7 Pages.

Huawei, HiSilicon, Discussion on 4-branch MIMO design options, 3GPP TSG-RAN WG1 Meeting #66bis, Zhuhai, China, Oct. 10-14, 2011, 3 Pages.

InterDigital Communications, LLC, "Codeword to layer mapping alternatives for DL 4 branch MIMO", 3GPP TSG-RAN WG1 Meeting #66bis, Zhuhai, china, Oct. 10-14, 2011, 3 Pages.

* cited by examiner

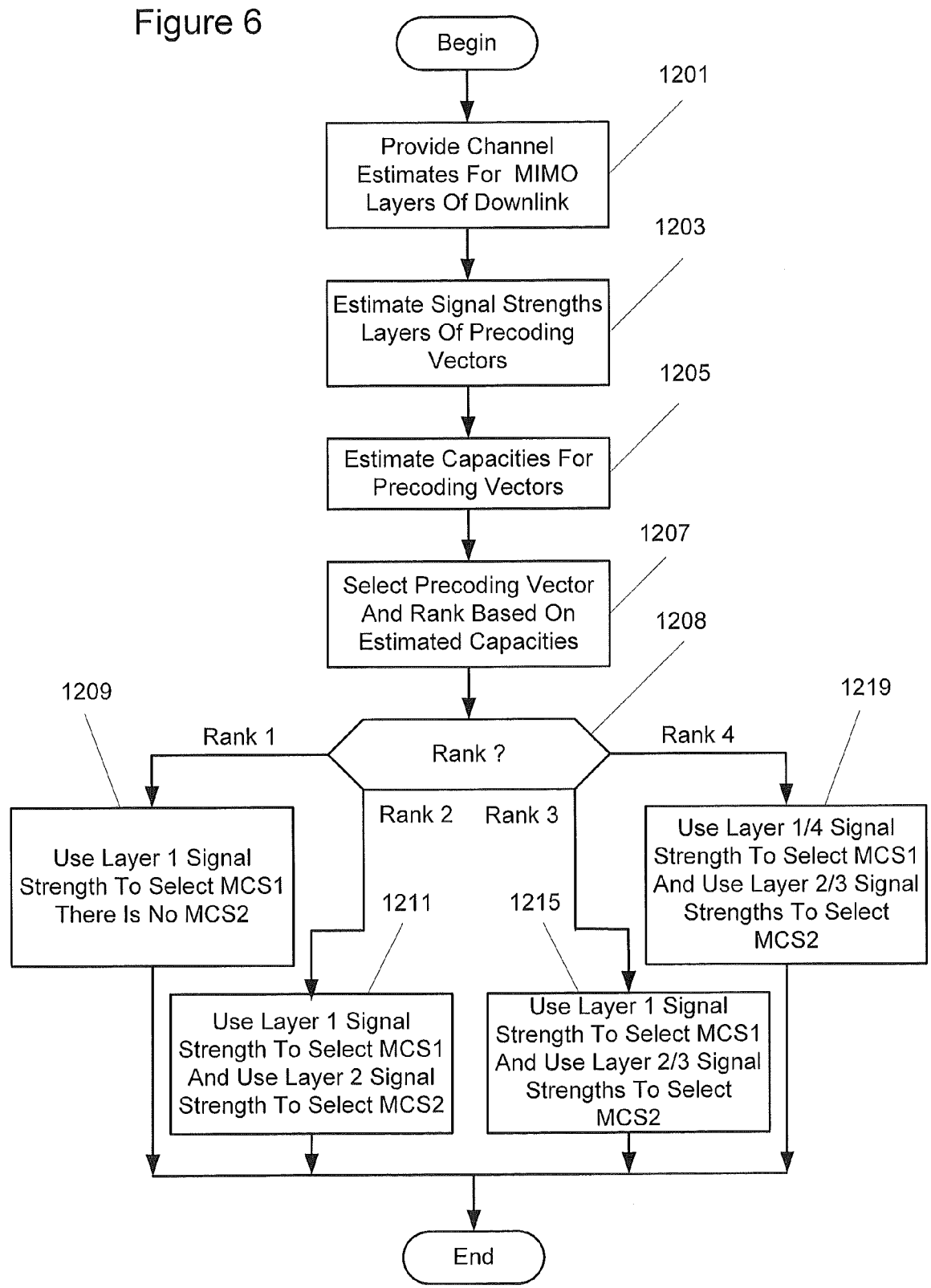

SNR MATRIX (FOR METHODS 1 AND 2)

FIG. 7A

| PCIs | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ | $P_{1,12}$ | $P_{1,13}$ | $P_{1,14}$ | $P_{1,15}$ | $P_{1,16}$ |
|---|---|---|---|---|---|---|---|---|---|---|---|---|---|---|---|---|
| L-1 SNRs | $S_{1,1,1}$ | $S_{1,1,2}$ | $S_{1,1,3}$ | $S_{1,1,4}$ | $S_{1,1,5}$ | $S_{1,1,6}$ | $S_{1,1,7}$ | $S_{1,1,8}$ | $S_{1,1,9}$ | $S_{1,1,10}$ | $S_{1,1,11}$ | $S_{1,1,12}$ | $S_{1,1,13}$ | $S_{1,1,14}$ | $S_{1,1,15}$ | $S_{1,1,16}$ |
| L-2 SNRs | N/A | N/A | N/A | N/A | N/A | N/A | N/A | N/A | N/A | N/A | N/A | N/A | N/A | N/A | N/A | N/A |
| L-3 SNRs | N/A | N/A | N/A | N/A | N/A | N/A | N/A | N/A | N/A | N/A | N/A | N/A | N/A | N/A | N/A | N/A |
| L-4 SNRs | N/A | N/A | N/A | N/A | N/A | N/A | N/A | N/A | N/A | N/A | N/A | N/A | N/A | N/A | N/A | N/A |

Rank 1 Precoding Indices (PCIs) And Corresponding Signal To Noise Ratios (SNRs)

FIG. 7B

| PCIs | $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | $P_{2,10}$ | $P_{2,11}$ | $P_{2,12}$ | $P_{2,13}$ | $P_{2,14}$ | $P_{2,15}$ | $P_{2,16}$ |
|---|---|---|---|---|---|---|---|---|---|---|---|---|---|---|---|---|
| L-1 SNRs | $S_{2,1,1}$ | $S_{2,1,2}$ | $S_{2,1,3}$ | $S_{2,1,4}$ | $S_{2,1,5}$ | $S_{2,1,6}$ | $S_{2,1,7}$ | $S_{2,1,8}$ | $S_{2,1,9}$ | $S_{2,1,10}$ | $S_{2,1,11}$ | $S_{2,1,12}$ | $S_{2,1,13}$ | $S_{2,1,14}$ | $S_{2,1,15}$ | $S_{2,1,16}$ |
| L-2 SNRs | $S_{2,2,1}$ | $S_{2,2,2}$ | $S_{2,2,3}$ | $S_{2,2,4}$ | $S_{2,2,5}$ | $S_{2,2,6}$ | $S_{2,2,7}$ | $S_{2,2,8}$ | $S_{2,2,9}$ | $S_{2,2,10}$ | $S_{2,2,11}$ | $S_{2,2,12}$ | $S_{2,2,13}$ | $S_{2,2,14}$ | $S_{2,2,15}$ | $S_{2,2,16}$ |
| L-3 SNRs | N/A | N/A | N/A | N/A | N/A | N/A | N/A | N/A | N/A | N/A | N/A | N/A | N/A | N/A | N/A | N/A |
| L-4 SNRs | N/A | N/A | N/A | N/A | N/A | N/A | N/A | N/A | N/A | N/A | N/A | N/A | N/A | N/A | N/A | N/A |

Rank 2 Precoding Indices (PCIs) And Corresponding Signal To Noise Ratios (SNRs)

FIG. 7C

| PCIs | $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | $P_{3,10}$ | $P_{3,11}$ | $P_{3,12}$ | $P_{3,13}$ | $P_{3,14}$ | $P_{3,15}$ | $P_{3,16}$ |
|---|---|---|---|---|---|---|---|---|---|---|---|---|---|---|---|---|
| L-1 SNRs | $S_{3,1,1}$ | $S_{3,1,2}$ | $S_{3,1,3}$ | $S3_{1,4}$ | $S_{3,1,5}$ | $S_{3,1,6}$ | $S_{3,1,7}$ | $S_{3,1,8}$ | $S_{3,1,9}$ | $S_{3,1,10}$ | $S_{3,1,11}$ | $S_{3,1,12}$ | $S_{3,1,13}$ | $S_{3,1,14}$ | $S3_{1,15}$ | $S_{3,1,16}$ |
| L-2 SNRs | $S_{3,2,1}$ | $S_{3,2,2}$ | $S_{3,2,3}$ | $S3_{2,4}$ | $S_{3,2,5}$ | $S_{3,2,6}$ | $S_{3,2,7}$ | $S_{3,2,8}$ | $S_{3,2,9}$ | $S_{3,2,10}$ | $S_{3,2,11}$ | $S_{3,2,12}$ | $S_{3,2,13}$ | $S_{3,2,14}$ | $S3_{2,15}$ | $S_{3,2,16}$ |
| L-3 SNRs | $S_{3,3,1}$ | $S_{3,3,2}$ | $S_{3,3,3}$ | $S3_{3,4}$ | $S_{3,3,5}$ | $S_{3,3,6}$ | $S_{3,3,7}$ | $S_{3,3,8}$ | $S_{3,3,9}$ | $S_{3,3,10}$ | $S_{3,3,11}$ | $S_{3,3,12}$ | $S_{3,3,13}$ | $S_{3,3,14}$ | $S3_{3,15}$ | $S_{3,3,16}$ |
| L-4 SNRs | N/A | N/A | N/A | N/A | N/A | N/A | N/A | N/A | N/A | N/A | N/A | N/A | N/A | N/A | N/A | N/A |

Rank 3 Precoding Indices (PCIs) And Corresponding Signal To Noise Ratios (SNRs)

FIG. 7D

| PCIs | $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | $P_{4,10}$ | $P_{4,11}$ | $P_{4,12}$ | $P_{4,13}$ | $P_{4,14}$ | $P_{4,15}$ | $P_{4,16}$ |
|---|---|---|---|---|---|---|---|---|---|---|---|---|---|---|---|---|
| L-1 SNRs | $S_{4,1,1}$ | $S_{4,1,2}$ | $S_{4,1,3}$ | $S_{4,1,4}$ | $S_{4,1,5}$ | $S_{4,1,6}$ | $S_{4,1,7}$ | $S_{4,1,8}$ | $S_{4,1,9}$ | $S_{4,1,10}$ | $S_{4,1,11}$ | $S_{4,1,12}$ | $S_{4,1,13}$ | $S_{4,1,14}$ | $S_{4,1,15}$ | $S_{4,1,16}$ |
| L-2 SNRs | $S_{4,2,1}$ | $S_{4,2,2}$ | $S_{4,2,3}$ | $S_{4,2,4}$ | $S_{4,2,5}$ | $S_{4,2,6}$ | $S_{4,2,7}$ | $S_{4,2,8}$ | $S_{4,2,9}$ | $S_{4,2,10}$ | $S_{4,2,11}$ | $S4_{2,12}$ | $S_{4,2,13}$ | $S_{4,2,14}$ | $S_{4,2,15}$ | $S_{4,2,16}$ |
| L-3 SNRs | $S_{4,3,1}$ | $S_{4,3,2}$ | $S_{4,3,3}$ | $S_{4,3,4}$ | $S_{4,3,5}$ | $S_{4,3,6}$ | $S_{4,3,7}$ | $S_{4,3,8}$ | $S_{4,3,9}$ | $S_{4,3,10}$ | $S_{4,3,11}$ | $S_{4,3,12}$ | $S_{4,3,13}$ | $S_{4,3,14}$ | $S_{4,3,15}$ | $S_{4,3,16}$ |
| L-4 SNRs | $S_{4,4,1}$ | $S_{4,4,2}$ | $S_{4,4,3}$ | $S_{4,4,4}$ | $S_{4,4,5}$ | $S_{4,4,6}$ | $S_{4,4,7}$ | $S_{4,4,8}$ | $S_{4,4,9}$ | $S_{4,4,10}$ | $S_{4,4,11}$ | $S_{4,4,12}$ | $S_{4,4,13}$ | $S_{4,4,14}$ | $S_{4,4,15}$ | $S_{4,4,16}$ |

Rank 4 Precoding Indices (PCIs) And Corresponding Signal To Noise Ratios (SNRs)

CAPACITY MATRIX

FIG. 8A

| PCIs | Rank 1 Precoding Indices (PCIs) And Corresponding Spectral Efficiencies |||||||||||||||| |
|---|---|---|---|---|---|---|---|---|---|---|---|---|---|---|---|---|
| PCIs | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ | $P_{1,12}$ | $P_{1,13}$ | $P_{1,14}$ | $P_{1,15}$ | $P_{1,16}$ |
| Capacity | $C_{1,1}$ | $C_{1,2}$ | $C_{1,3}$ | $C_{1,4}$ | $C_{1,5}$ | $C_{1,6}$ | $C_{1,7}$ | $C_{1,8}$ | $C_{1,9}$ | $C_{1,10}$ | $C_{1,11}$ | $C_{1,12}$ | $C_{1,13}$ | $C_{1,14}$ | $C_{1,15}$ | $C_{1,16}$ |

FIG. 8B

| | Rank 2 Precoding Indices (PCIs) And Corresponding Spectral Efficiencies |||||||||||||||| |
|---|---|---|---|---|---|---|---|---|---|---|---|---|---|---|---|---|
| PCIs | $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | $P_{2,10}$ | $P_{2,11}$ | $P_{2,12}$ | $P_{2,13}$ | $P_{2,14}$ | $P_{2,15}$ | $P_{2,16}$ |
| Capacity | $C_{2,1}$ | $C_{2,2}$ | $C_{2,3}$ | $C_{2,4}$ | $C_{2,5}$ | $C_{2,6}$ | $C_{2,7}$ | $C_{2,8}$ | $C_{2,9}$ | $C_{2,10}$ | $C_{2,11}$ | $C_{2,12}$ | $C_{2,13}$ | $C_{2,14}$ | $C_{2,15}$ | $C_{2,16}$ |

FIG. 8C

| | Rank 3 Precoding Indices (PCIs) And Corresponding Spectral Efficiencies |||||||||||||||| |
|---|---|---|---|---|---|---|---|---|---|---|---|---|---|---|---|---|
| PCIs | $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | $P_{3,10}$ | $P_{3,11}$ | $P_{3,12}$ | $P_{3,13}$ | $P_{3,14}$ | $P_{3,15}$ | $P_{3,16}$ |
| Capacity | $C_{3,1}$ | $C_{3,2}$ | $C_{3,3}$ | $C_{3,4}$ | $C_{3,5}$ | $C_{3,6}$ | $C_{3,7}$ | $C_{3,8}$ | $C_{3,9}$ | $C_{3,10}$ | $C_{3,11}$ | $C_{3,12}$ | $C_{3,13}$ | $C_{3,14}$ | $C_{3,15}$ | $C_{3,16}$ |

FIG. 8D

| | Rank 4 Precoding Indices (PCIs) And Corresponding Spectral Efficiencies |||||||||||||||| |
|---|---|---|---|---|---|---|---|---|---|---|---|---|---|---|---|---|
| PCIs | $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | $P_{4,10}$ | $P_{4,11}$ | $P_{4,12}$ | $P_{4,13}$ | $P_{4,14}$ | $P_{4,15}$ | $P_{4,16}$ |
| Capacity | $C_{4,1}$ | $C_{4,2}$ | $C_{4,3}$ | $C_{4,4}$ | $C_{4,5}$ | $C_{4,6}$ | $C_{4,7}$ | $C_{4,8}$ | $C_{4,9}$ | $C_{4,10}$ | $C_{4,11}$ | $C_{4,12}$ | $C_{4,13}$ | $C_{4,14}$ | $C_{4,15}$ | $C_{4,16}$ |

MCS Selection For $P_{i,j}$ where i=Rank and j=index

FIG. 9

| Rank | MCS Selection Based On Precoding Vector Selection And Corresponding Singal Strength(s) ||||
|---|---|---|---|---|
| Rank | Rank (i) = 1 | Rank (i) = 2 | Rank (i) = 3 | Rank (i) = 4 |
| MCS-1 | Function($S_{1,1,j}$) | Function($S_{2,1,j}$) | Function($S_{3,1,j}$) | Function($S_{4,1,j}$ and/or $S_{4,4,j}$) |
| MCS-2 | N/A | Function($S_{2,2,j}$) | Function($S_{3,2,j}$ and/or $S_{3,3,j}$) | Function($S_{4,2,j}$ and/or $S_{4,3,j}$) |

MCS MATRIX

FIG. 13A

| PCIs | Rank 1 Precoding Indices (PCIs) And Corresponding Modulation And Coding Schemes (MCSs) | | | | | | | | | | | | | | | |
|---|---|---|---|---|---|---|---|---|---|---|---|---|---|---|---|---|
| | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ | $P_{1,12}$ | $P_{1,13}$ | $P_{1,14}$ | $P_{1,15}$ | $P_{1,16}$ |
| L-1 MCSs | $M1_{1,1}$ | $M_{1,1,2}$ | $M_{1,1,3}$ | $M_{1,1,4}$ | $M_{1,1,5}$ | $M_{1,1,6}$ | $M_{1,1,7}$ | $M_{1,1,8}$ | $M_{1,1,9}$ | $M_{1,1,10}$ | $M_{1,1,11}$ | $M_{1,1,12}$ | $M_{1,1,13}$ | $M_{1,1,14}$ | $M_{1,1,15}$ | $M_{1,1,16}$ |
| L-2 MCSs | N/A | N/A | N/A | N/A | N/A | N/A | N/A | N/A | N/A | N/A | N/A | N/A | N/A | N/A | N/A | N/A |
| L-3 MCSs | N/A | N/A | N/A | N/A | N/A | N/A | N/A | N/A | N/A | N/A | N/A | N/A | N/A | N/A | N/A | N/A |
| L-4 MCSs | N/A | N/A | N/A | N/A | N/A | N/A | N/A | N/A | N/A | N/A | N/A | N/A | N/A | N/A | N/A | N/A |

FIG. 13B

| PCIs | Rank 2 Precoding Indices (PCIs) And Corresponding Modulation And Coding Schemes (MCSs) | | | | | | | | | | | | | | | |
|---|---|---|---|---|---|---|---|---|---|---|---|---|---|---|---|---|
| | $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | $P_{2,10}$ | $P_{2,11}$ | $P_{2,12}$ | $P_{2,13}$ | $P_{2,14}$ | $P_{2,15}$ | $P_{2,16}$ |
| L-1 MCSs | $M_{2,1,1}$ | $M_{2,1,2}$ | $M_{2,1,3}$ | $M_{2,1,4}$ | $M_{2,1,5}$ | $M_{2,1,6}$ | $M_{2,1,7}$ | $M_{2,1,8}$ | $M_{2,1,9}$ | $M_{2,1,10}$ | $M_{2,1,11}$ | $M_{2,1,12}$ | $M_{2,1,13}$ | $M_{2,1,14}$ | $M_{2,1,15}$ | $M_{2,1,16}$ |
| L-2 MCSs | $M_{2,2,1}$ | $M_{2,2,2}$ | $M_{2,2,3}$ | $M_{2,2,4}$ | $M_{2,2,5}$ | $M_{2,2,6}$ | $M_{2,2,7}$ | $M_{2,2,8}$ | $M_{2,2,9}$ | $M_{2,2,10}$ | $M_{2,2,11}$ | $M_{2,2,12}$ | $M_{2,2,13}$ | $M_{2,2,14}$ | $M_{2,2,15}$ | $M_{2,2,16}$ |
| L-3 MCSs | N/A | N/A | N/A | N/A | N/A | N/A | N/A | N/A | N/A | N/A | N/A | N/A | N/A | N/A | N/A | N/A |
| L-4 MCSs | N/A | N/A | N/A | N/A | N/A | N/A | N/A | N/A | N/A | N/A | N/A | N/A | N/A | N/A | N/A | N/A |

FIG. 13C

| PCIs | Rank 3 Precoding Indices (PCIs) And Corresponding Modulation And Coding Schemes (MCSs) | | | | | | | | | | | | | | | |
|---|---|---|---|---|---|---|---|---|---|---|---|---|---|---|---|---|
| | $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | $P_{3,10}$ | $P_{3,11}$ | $P_{3,12}$ | $P_{3,13}$ | $P_{3,14}$ | $P_{3,15}$ | $P_{3,16}$ |
| L-1 MCSs | $M_{3,1,1}$ | $M_{3,1,2}$ | $M_{3,1,3}$ | $M_{3,1,4}$ | $M_{3,1,5}$ | $M_{3,1,6}$ | $M_{3,1,7}$ | $M_{3,1,8}$ | $M_{3,1,9}$ | $M_{3,1,10}$ | $M_{3,1,11}$ | $M_{3,1,12}$ | $M_{3,1,13}$ | $M_{3,1,14}$ | $M_{3,1,15}$ | $M_{3,1,16}$ |
| L-2 MCSs | $M_{3,2,1}$ | $M_{3,2,2}$ | $M_{3,2,3}$ | $M_{3,2,4}$ | $M_{3,2,5}$ | $M_{3,2,6}$ | $M_{3,2,7}$ | $M_{3,2,8}$ | $M_{3,2,9}$ | $M_{3,2,10}$ | $M_{3,2,11}$ | $M_{3,2,12}$ | $M_{3,2,13}$ | $M_{3,2,14}$ | $M_{3,2,15}$ | $M_{3,2,16}$ |
| L-3 MCSs | $M_{3,3,1}$ | $M_{3,3,2}$ | $M_{3,3,3}$ | $M_{3,3,4}$ | $M_{3,3,5}$ | $M_{3,3,6}$ | $M_{3,3,7}$ | $M_{3,3,8}$ | $M_{3,3,9}$ | $M_{3,3,10}$ | $M_{3,3,11}$ | $M_{3,3,12}$ | $M_{3,3,13}$ | N/A | $M_{3,3,15}$ | $M_{3,3,16}$ |
| L-4 MCSs | N/A | N/A | N/A | N/A | N/A | N/A | N/A | N/A | N/A | N/A | N/A | N/A | N/A | N/A | N/A | N/A |

FIG. 13D

| PCIs | Rank 4 Precoding Indices (PCIs) And Corresponding Modulation And Coding Schemes (MCSs) | | | | | | | | | | | | | | | |
|---|---|---|---|---|---|---|---|---|---|---|---|---|---|---|---|---|
| | $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | $P_{4,10}$ | $P_{4,11}$ | $P_{4,12}$ | $P_{4,13}$ | $P_{4,14}$ | $P_{4,15}$ | $P_{4,16}$ |
| L-1 MCSs | $M_{4,1,1}$ | $M_{4,1,2}$ | $M_{4,1,3}$ | $M_{4,1,4}$ | $M_{4,1,5}$ | $M_{4,1,6}$ | $M_{4,1,7}$ | $M_{4,1,8}$ | $M_{4,1,9}$ | $M4_{1,10}$ | $M_{4,1,11}$ | $M_{4,1,12}$ | $M_{4,1,13}$ | $M_{4,1,14}$ | $M_{4,1,15}$ | $M_{4,1,16}$ |
| L-2 MCSs | $M_{4,2,1}$ | $M_{4,2,2}$ | $M_{4,2,3}$ | $M_{4,2,4}$ | $M_{4,2,5}$ | $M_{4,2,6}$ | $M_{4,2,7}$ | $M_{4,2,8}$ | $M_{4,2,9}$ | $M4_{2,10}$ | $M_{4,2,11}$ | $M_{4,2,12}$ | $M_{4,2,13}$ | $M_{4,2,14}$ | $M_{4,2,15}$ | $M_{4,2,16}$ |
| L-3 MCSs | $M_{4,3,1}$ | $M_{4,3,2}$ | $M_{4,3,3}$ | $M_{4,3,4}$ | $M_{4,3,5}$ | $M_{4,3,6}$ | $M_{4,3,7}$ | $M_{4,3,8}$ | $M_{4,3,9}$ | $M_{4,3,10}$ | $M_{4,3,11}$ | $M_{4,3,12}$ | $M_{4,3,13}$ | $M_{4,3,14}$ | $M_{4,3,15}$ | $M_{4,3,16}$ |
| L-4 MCSs | $M_{4,4,1}$ | $M_{4,4,2}$ | $M_{4,4,3}$ | $M_{4,4,4}$ | $M_{4,4,5}$ | $M_{4,4,6}$ | $M_{4,4,7}$ | $M_{4,4,8}$ | $M_{4,4,9}$ | $M_{4,4,10}$ | $M_{4,4,11}$ | $M_{4,4,12}$ | $M_{4,4,13}$ | $M_{4,4,14}$ | $M_{4,4,15}$ | N/A |

INDIVIDUAL SPECTRAL EFFICIENCY MATRIX

FIG. 14A

| PCIs | Rank 1 Precoding Indices (PCIs) And Corresponding Spectral Efficiencies | | | | | | | | | | | | | | | |
|---|---|---|---|---|---|---|---|---|---|---|---|---|---|---|---|---|
| | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ | $P_{1,12}$ | $P_{1,13}$ | $P_{1,14}$ | $P_{1,15}$ | $P_{1,16}$ |
| L-1 Eff. | $E_{1,1,1}$ | $E_{1,1,2}$ | $E_{1,1,3}$ | $E_{1,1,4}$ | $E_{1,1,5}$ | $E_{1,1,6}$ | $E_{1,1,7}$ | $E_{1,1,8}$ | $E_{1,1,9}$ | $E_{1,1,10}$ | $E_{1,1,11}$ | $E_{1,1,12}$ | $E_{1,1,13}$ | $E_{1,1,14}$ | $E_{1,1,15}$ | $E_{1,1,16}$ |
| L-2 Eff. | N/A | N/A | N/A | N/A | N/A | N/A | N/A | N/A | N/A | N/A | N/A | N/A | N/A | N/A | N/A | N/A |
| L-3 Eff. | N/A | N/A | N/A | N/A | N/A | N/A | N/A | N/A | N/A | N/A | N/A | N/A | N/A | N/A | N/A | N/A |
| L-4 Eff. | N/A | N/A | N/A | N/A | N/A | N/A | N/A | N/A | N/A | N/A | N/A | N/A | N/A | N/A | N/A | N/A |

FIG. 14B

| PCIs | Rank 2 Precoding Indices (PCIs) And Corresponding Spectral Efficiencies | | | | | | | | | | | | | | | |
|---|---|---|---|---|---|---|---|---|---|---|---|---|---|---|---|---|
| | $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | $P_{2,10}$ | $P_{2,11}$ | $P_{2,12}$ | $P_{2,13}$ | $P_{2,14}$ | $P_{2,15}$ | $P_{2,16}$ |
| L-1 Eff. | $E_{2,1,1}$ | $E_{2,1,2}$ | $E_{2,1,3}$ | $E_{2,1,4}$ | $E_{2,1,5}$ | $E_{2,1,6}$ | $E_{2,1,7}$ | $E_{2,1,8}$ | $E_{2,1,9}$ | $E_{2,1,10}$ | $E_{2,1,11}$ | $E_{2,1,12}$ | $E_{2,1,13}$ | $E_{2,1,14}$ | $E_{2,1,15}$ | $E_{2,1,16}$ |
| L-2 Eff. | $E_{2,2,1}$ | $E_{2,2,2}$ | $E_{2,2,3}$ | $E_{2,2,4}$ | $E_{2,2,5}$ | $E_{2,2,6}$ | $E_{2,2,7}$ | $E_{2,2,8}$ | $E_{2,2,9}$ | $E_{2,2,10}$ | $E_{2,2,11}$ | $E_{2,2,12}$ | $E_{2,2,13}$ | $E_{2,2,14}$ | $E_{2,2,15}$ | $E_{2,2,16}$ |
| L-3 Eff. | N/A | N/A | N/A | N/A | N/A | N/A | N/A | N/A | N/A | N/A | N/A | N/A | N/A | N/A | N/A | N/A |
| L-4 Eff. | N/A | N/A | N/A | N/A | N/A | N/A | N/A | N/A | N/A | N/A | N/A | N/A | N/A | N/A | N/A | N/A |

FIG. 14C

| PCIs | Rank 3 Precoding Indices (PCIs) And Corresponding Spectral Efficiencies | | | | | | | | | | | | | | | |
|---|---|---|---|---|---|---|---|---|---|---|---|---|---|---|---|---|
| | $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | $P_{3,10}$ | $P_{3,11}$ | $P_{3,12}$ | $P_{3,13}$ | $P_{3,14}$ | $P_{3,15}$ | $P_{3,16}$ |
| L-1 Eff. | $E_{3,1,1}$ | $E_{3,1,2}$ | $E_{3,1,3}$ | $E_{3,1,4}$ | $E_{3,1,5}$ | $E_{3,1,6}$ | $E_{3,1,7}$ | $E_{3,1,8}$ | $E_{3,1,9}$ | $E_{3,1,10}$ | $E_{3,1,11}$ | $E_{3,1,12}$ | $E_{3,1,13}$ | $E_{3,1,14}$ | $E_{3,1,15}$ | $E_{3,1,16}$ |
| L-2 Eff. | $E_{3,2,1}$ | $E_{3,2,2}$ | $E_{3,2,3}$ | $E_{3,2,4}$ | $E_{3,2,5}$ | $E_{3,2,6}$ | $E_{3,2,7}$ | $E_{3,2,8}$ | $E_{3,2,9}$ | $E_{3,2,10}$ | $E_{3,2,11}$ | $E_{3,2,12}$ | $E_{3,2,13}$ | $E_{3,2,14}$ | $E_{3,2,15}$ | $E_{3,2,16}$ |
| L-3 Eff. | $E_{3,3,1}$ | $E_{3,3,2}$ | $E_{3,3,3}$ | $E_{3,3,4}$ | $E_{3,3,5}$ | $E_{3,3,6}$ | $E_{3,3,7}$ | $E_{3,3,8}$ | $E_{3,3,9}$ | $E_{3,3,10}$ | $E_{3,3,11}$ | $E_{3,3,12}$ | $E_{3,3,13}$ | $E_{3,3,14}$ | $E_{3,3,15}$ | $E_{3,3,16}$ |
| L-4 Eff. | N/A | N/A | N/A | N/A | N/A | N/A | N/A | N/A | N/A | N/A | N/A | N/A | N/A | N/A | N/A | N/A |

FIG. 14D

| PCIs | Rank 4 Precoding Indices (PCIs) And Corresponding Spectral Efficiencies | | | | | | | | | | | | | | | |
|---|---|---|---|---|---|---|---|---|---|---|---|---|---|---|---|---|
| | $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | $P_{4,10}$ | $P_{4,11}$ | $P_{4,12}$ | $P_{4,13}$ | $P_{4,14}$ | $P_{4,15}$ | $P_{4,16}$ |
| L-1 Eff. | $E_{4,1,1}$ | $E_{4,1,2}$ | $E_{4,1,3}$ | $E_{4,1,4}$ | $E_{4,1,5}$ | $E_{4,1,6}$ | $E_{4,1,7}$ | $E_{4,1,8}$ | $E_{4,1,9}$ | $E_{4,1,10}$ | $E_{4,1,11}$ | $E_{4,1,12}$ | $E_{4,1,13}$ | $E_{4,1,14}$ | $E_{4,1,15}$ | $E_{4,1,16}$ |
| L-2 Eff. | $E_{4,2,1}$ | $E_{4,2,2}$ | $E_{4,2,3}$ | $E_{4,2,4}$ | $E_{4,2,5}$ | $E_{4,2,6}$ | $E_{4,2,7}$ | $E_{4,2,8}$ | $E_{4,2,9}$ | $E_{4,2,10}$ | $E_{4,2,11}$ | $E_{4,2,12}$ | $E_{4,2,13}$ | $E_{4,2,14}$ | $E_{4,2,15}$ | $E_{4,2,16}$ |
| L-3 Eff. | $E_{4,3,1}$ | $E_{4,3,2}$ | $E_{4,3,3}$ | $E_{4,3,4}$ | $E_{4,3,5}$ | $E_{4,3,6}$ | $E_{4,3,7}$ | $E_{4,3,8}$ | $E_{4,3,9}$ | $E_{4,3,10}$ | $E_{4,3,11}$ | $E_{4,3,12}$ | $E_{4,3,13}$ | $E_{4,3,14}$ | $E_{4,3,15}$ | $E_{4,3,16}$ |
| L-4 Eff. | $E_{4,4,1}$ | $E_{4,4,2}$ | $E_{4,4,3}$ | $E_{4,4,4}$ | $E_{4,4,5}$ | $E_{4,4,6}$ | $E_{4,4,7}$ | $E_{4,4,8}$ | $E_{4,4,9}$ | $E_{4,4,10}$ | $E_{4,4,11}$ | $E_{4,4,12}$ | $E_{4,4,13}$ | $E_{4,4,14}$ | $E_{4,4,15}$ | $E_{4,4,16}$ |

COMBINED SPECTRAL EFFICIENCY MATRIX

FIG. 15A — Rank 1 Precoding Indices (PCIs) And Corresponding Spectral Efficiencies

| PCIs | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ | $P_{1,12}$ | $P_{1,13}$ | $P_{1,14}$ | $P_{1,15}$ | $P_{1,16}$ |
|---|---|---|---|---|---|---|---|---|---|---|---|---|---|---|---|---|
| Spectral Efficiency | $SE_{1,1}$ | $SE_{1,2}$ | $SE_{1,3}$ | $SE_{1,4}$ | $SE_{1,5}$ | $SE_{1,6}$ | $SE_{1,7}$ | $SE_{1,8}$ | $SE_{1,9}$ | $SE_{1,10}$ | $SE_{1,11}$ | $SE_{1,12}$ | $SE_{1,13}$ | $SE_{1,14}$ | $SE_{1,15}$ | $SE_{1,16}$ |

FIG. 15B — Rank 2 Precoding Indices (PCIs) And Corresponding Spectral Efficiencies

| PCIs | $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ | $P_{2,10}$ | $P_{2,11}$ | $P_{2,12}$ | $P_{2,13}$ | $P_{2,14}$ | $P_{2,15}$ | $P_{2,16}$ |
|---|---|---|---|---|---|---|---|---|---|---|---|---|---|---|---|---|
| Spectral Efficiency | $SE_{2,1}$ | $SE_{2,2}$ | $SE_{2,3}$ | $SE_{2,4}$ | $SE_{2,5}$ | $SE_{2,6}$ | $SE_{2,7}$ | $SE_{2,8}$ | $SE_{2,9}$ | $SE_{2,10}$ | $SE_{2,11}$ | $SE_{2,12}$ | $SE_{2,13}$ | $SE_{2,14}$ | $SE_{2,15}$ | $SE_{2,16}$ |

FIG. 15C — Rank 3 Precoding Indices (PCIs) And Corresponding Spectral Efficiencies

| PCIs | $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ | $P_{3,10}$ | $P_{3,11}$ | $P_{3,12}$ | $P_{3,13}$ | $P_{3,14}$ | $P_{3,15}$ | $P_{3,16}$ |
|---|---|---|---|---|---|---|---|---|---|---|---|---|---|---|---|---|
| Spectral Efficiency | $SE_{3,1}$ | $SE_{3,2}$ | $SE_{3,3}$ | $SE_{3,4}$ | $SE_{3,5}$ | $SE_{3,6}$ | $SE_{3,7}$ | $SE_{3,8}$ | $SE_{3,9}$ | $SE_{3,10}$ | $SE_{3,11}$ | $SE_{3,12}$ | $SE_{3,13}$ | $SE_{3,14}$ | $SE_{3,15}$ | $SE_{3,16}$ |

FIG. 15D — Rank 4 Precoding Indices (PCIs) And Corresponding Spectral Efficiencies

| PCIs | $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ | $P_{4,10}$ | $P_{4,11}$ | $P_{4,12}$ | $P_{4,13}$ | $P_{4,14}$ | $P_{4,15}$ | $P_{4,16}$ |
|---|---|---|---|---|---|---|---|---|---|---|---|---|---|---|---|---|
| Spectral Efficiency | $SE_{4,1}$ | $SE_{4,2}$ | $SE_{4,3}$ | $SE_{4,4}$ | $SE_{4,5}$ | $SE_{4,6}$ | $SE_{4,7}$ | $SE_{4,8}$ | $SE_{4,9}$ | $SE_{4,10}$ | $SE_{4,11}$ | $SE_{4,12}$ | $SE_{4,13}$ | $SE_{4,14}$ | $SE_{4,15}$ | $SE_{4,16}$ |

Link Level Performance Of 4X4 MIMO With 4 and 2 Codewords (Block diagram of 4-TX MIMO with 2 codewords)

Table 1 Layer mapping for 4x4 MIMO with 2 codewords

| Number of layers | Number of code words | Codeword-to-layer mapping $i = 0,1,...,M-1$ |
|---|---|---|
| 1 | 1 | $x^{(1)}(i) = d^{(1)}(i)$ |
| 2 | 2 | $x^{(1)}(i) = d^{(1)}(i)$ <br> $x^{(2)}(i) = d^{(2)}(i)$ |
| 3 | 2 | $x^{(1)}(i) = d^{(1)}(2i)$ <br> $x^{(2)}(i) = d^{(1)}(2i+1)$ <br><br> $x^{(3)}(i) = d^{(2)}(i)$ |
| 4 | 2 | $x^{(1)}(i) = d^{(1)}(2i)$ <br> $x^{(2)}(i) = d^{(1)}(2i+1)$ <br><br> $x^{(3)}(i) = d^{(2)}(2i)$ <br> $x^{(4)}(i) = d^{(2)}(2i+1)$ |

US 9,031,018 B2

METHODS SELECTING MODULATION/CODING SCHEMES MAPPED TO MULTIPLE MIMO LAYERS AND RELATED USER EQUIPMENT

RELATED APPLICATION

The present application claims the benefit of priority from U.S. Provisional Application No. 61/559,872 filed Nov. 15, 2011, the disclosure of which is hereby incorporated herein in its entirety by reference.

TECHNICAL FIELD

The present disclosure is directed to wireless communications and, more particularly, to multiple-input-multiple-output (MIMO) wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink transmission time interval (TTI) and/or time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same time/frequency resource element (TFRE) to provide increased reliability of reception at the wireless terminal due to transmit diversity gain.

Four layer MIMO transmission (4Tx) schemes are proposed for High-Speed-Downlink-Packet-Access (HSDPA) within Third Generation Partnership Project (3GPP) standardization as disclosed, for example, in 3GPP RP-111393 ("New WI: Four Branch MIMO Transmission For HSDPA," 3GPP TSG-RAN meeting #53, Fukuoka, Japan, Sep. 13-16, 2011) and 3GPP R1-111763 ("4-branch MIMO for HSDPA," 3GPP TAG RAN WG1 Meeting #5, Barcelona, Spain, May 9-13, 2011), the disclosures of both of which are hereby incorporated herein in their entireties by reference. Accordingly, up to 4 layers of information/data may be transmitted in parallel using a same TTI/TFRE when using 4-branch MIMO transmission.

The number of codewords supported by 4 branch MIMO is one issue regarding implementation of 4 branch MIMO. Contributions discussing possible configurations for 4×4 MIMO include 3GPP R1-113432 ("4×4 DL MIMO HS-DPCCH Design," 3GPP TSG RAN WG1 Meeting #66bis, Zhuhai, P. R. China, Oct. 10-14, 2011), 3GPP R1-112979 ("Discussion on 4-Branch MIMO Design Options," 3GPP TSG-RAN WG1 Meeting #66bis, Zhuhia, China, Oct. 10-14, 2011), and 3GPP R1-113360 ("Codeword to Layer Mapping Alternatives For DL 4 Branch MIMO," 3GPP TSG-RAN WG1 Meeting #66bis, Zhuhia, China, Oct. 10-14, 2011), the disclosures of which are hereby incorporated herein in their entireties by reference.

Among proposed configurations for 4×4 MIMO, configurations for 4 codeword 4×4 MIMO and 2 codeword 4×4 MIMO are likely candidates for further investigation. In 3GPP R1-114290 ("Number of Supported Codewords for 4-branch MIMO," 3GPP TSG RAN WG1 Meeting #67, San Francisco, USA, Nov. 14-18, 2011), a 2 codeword 4 branch MIMO is proposed for standardization, and the disclosure of 3GPP R1-114290 is hereby incorporated herein in its entirety by reference.

Channel quality information for a 4×4 MIMO system, however, may be difficult to compute and/or report.

SUMMARY

It may therefore be an object to address at least some of the above mentioned disadvantages and/or to improve performance in a wireless communication system.

According to some embodiments, a method of operating user equipment communicating with a base station of a radio access network may include selecting a multiple-input-multiple-output (MIMO) rank and a MIMO precoding entity from a codebook of MIMO precoding entities for a downlink communication from the base station to the user equipment. A modulation/coding scheme may be selected to be mapped to first and second MIMO layers of the downlink communication using the MIMO precoding entity. Channel quality information (CQI) identifying the MIMO precoding entity and the modulation/coding scheme may be communicated from the user equipment to the base station.

The modulation/coding scheme may be a first modulation/coding scheme. Responsive to selecting the MIMO precoding entity, a second modulation/coding scheme may be selected to be mapped to a third MIMO layer of the downlink communication using the MIMO precoding entity, with the channel quality information including the second modulation/coding scheme. For rank 3, the first modulation/coding scheme may be mapped to two different MIMO downlink transmission/reception layers, and the second modulation/coding scheme may be mapped to a third MIMO downlink transmission/reception layer.

The modulation/coding scheme may be a first modulation/coding scheme. Responsive to selecting the MIMO precoding entity, a second modulation/coding scheme may be selected to be mapped to third and fourth MIMO layers of the downlink communication using the MIMO precoding entity, with the channel quality information including the second modulation/coding scheme. For rank 4, the first modulation/coding scheme may be mapped to two different MIMO downlink transmission/reception layers, and the second modulation/coding scheme may be mapped to two other MIMO downlink transmission/reception layers.

Estimates of the downlink channel may be provided responsive to pilot signals received from the base station, and respective first and second signal strengths may be estimated for the first and second layers of the MIMO precoding entity, wherein selecting the modulation/coding scheme includes selecting the modulation/coding scheme responsive to a function of first and second signal strengths. Selecting the modulation/coding scheme may include selecting the modulation/coding scheme responsive to an average of the first and second signal strengths, responsive to a maximum of the first and second signal strengths, and/or responsive to a minimum of the first and second signal strengths.

Channel estimates may be provided for a downlink channel from the base station to the user equipment. Signal strengths may be estimated for the MIMO layers for the precoding entities of the codebook using the channel estimates. Capacities for the precoding entities of the codebook may be estimated using the signal strengths, wherein selecting the MIMO precoding entity includes selecting the MIMO precoding entity responsive to the capacities. Moreover, selecting may include selecting the modulation/coding scheme responsive to a function of first and second signal strengths estimated for the first and second MIMO layers for the precoding entity using the channel estimates. In addition, selecting the modulation/coding scheme may include selecting the modulation/coding scheme responsive to an average of the first and second signal strengths, responsive to a maximum of the first and second signal strengths, and/or responsive to a minimum of the first and second signal strengths.

A respective modulation/coding scheme may be selected for each of the layers of each of the MIMO precoding entities of the codebook. A respective layer efficiency may be calculated for each of the layers of each of the MIMO precoding entities of the codebook responsive to the respective modulation/coding schemes. A respective precoding entity efficiency may be provided for each of the MIMO precoding entities of the codebook responsive to the layer efficiencies of the respective MIMO precoding entities. Moreover, selecting the MIMO precoding entity may include selecting the MIMO precoding entity responsive to the precoding entity efficiencies.

Providing the respective precoding entity efficiency for the selected MIMO precoding entity may include providing the respective precoding entity efficiency for the selected MIMO precoding entity responsive to a function of first and second layer efficiencies for the first and second MIMO layers of the selected MIMO precoding entity.

Providing the respective precoding entity efficiency for the selected MIMO precoding entity responsive to a function of first and second layer efficiencies may include providing the respective precoding entity efficiency responsive to a maximum of the first and second layer efficiencies. Selecting the modulation/coding scheme to be mapped to the first and second MIMO layers of the selected precoding entity may include selecting one of a first modulation/coding scheme of the first layer of the selected MIMO precoding entity and a second modulation/coding scheme of the second layer of the selected MIMO precoding entity corresponding to the maximum of the first and second layer efficiencies.

Providing the respective precoding entity efficiency for the selected MIMO precoding entity responsive to a function of first and second layer efficiencies may include providing the respective precoding entity efficiency responsive to a minimum of the first and second layer efficiencies. Selecting the modulation/coding scheme to be mapped to the first and second MIMO layers of the selected precoding entity may include selecting one of a first modulation/coding scheme of the first layer of the selected MIMO precoding entity and a second modulation/coding scheme of the second layer of the selected MIMO precoding entity corresponding to the minimum of the first and second layer efficiencies.

Estimates of the downlink channel may be provided responsive to pilot signals received from the base station, and a respective signal strength may be estimated for each layer of each of the MIMO precoding entities of the codebook using the estimates of the downlink channel. Moreover, selecting may include selecting the respective modulation/coding scheme for each of the layers of each of the MIMO precoding entities of the codebook responsive to the respective signal strengths.

According to some other embodiments, user equipment may be configured to communicate with a base station of a radio access network. The user equipment may include a transceiver configured to receive communications from the base station and to transmit communications to the base station, and a processor coupled to the transceiver. The processor may be configured to select a multiple-input-multiple-output (MIMO) rank and a MIMO precoding entity from a codebook of MIMO precoding entities for a downlink communication from the base station to the user equipment, to select a modulation/coding scheme to be mapped to first and second MIMO layers of the downlink communication using the MIMO precoding entity, and to communicate channel quality information identifying the MIMO precoding entity and the modulation/coding scheme through the transceiver to the base station.

The processor may be further configured to provide estimates of the downlink channel responsive to pilot signals received from the base station, to estimate respective first and second signal strengths for the first and second layers of the MIMO precoding entity, and to select the modulation/coding scheme responsive to a function of first and second signal strengths.

The processor may be further configured to provide channel estimates for a downlink channel from the base station to the user equipment, to estimate signal strengths for the MIMO layers for the precoding entities of the codebook using the channel estimates, to estimate capacities for the precoding entities of the codebook using the signal strengths, to select the MIMO precoding entity responsive to the capacities, and to select the modulation/coding scheme responsive to a function of first and second signal strengths estimated for the first and second MIMO layers for the precoding entity using the channel estimates.

The processor may be further configured to select a respective modulation/coding scheme for each of the layers of each of the MIMO precoding entities of the codebook, to calculate a respective layer efficiency for each of the layers of each of the MIMO precoding entities of the codebook responsive to the respective modulation/coding schemes, to provide a respective precoding entity efficiency for each of the MIMO precoding entities of the codebook responsive to the layer efficiencies of the respective MIMO precoding entities, and to select the MIMO precoding entity responsive to the precoding entity efficiencies.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 6 is a flow chart illustrating operations of selecting channel quality information according to some embodiments of FIG. 5;

FIGS. 7A to 7D are tables illustrating a matrix of signal to noise ratios (SNRs) for precoding vector layers according to some embodiments of the present invention;

FIGS. 8A to 8D are tables illustrating a matrix of capacities of precoding vectors of FIGS. 7A to 7D;

FIG. 9 is a table illustrating modulation/coding scheme selection according to some embodiments of FIG. 5;

FIGS. 13A to 13D are tables illustrating a matrix of modulation/coding schemes corresponding to signal to noise ratios of FIGS. 7A to 7D;

FIGS. 14A to 14D are tables illustrating a matrix of spectral efficiencies corresponding to modulation/coding schemes of FIGS. 13A to 13D;

FIGS. 15A to 15D are tables illustrating a matrix of spectral efficiencies corresponding to precoding vectors;

DETAILED DESCRIPTION

Figure 1:
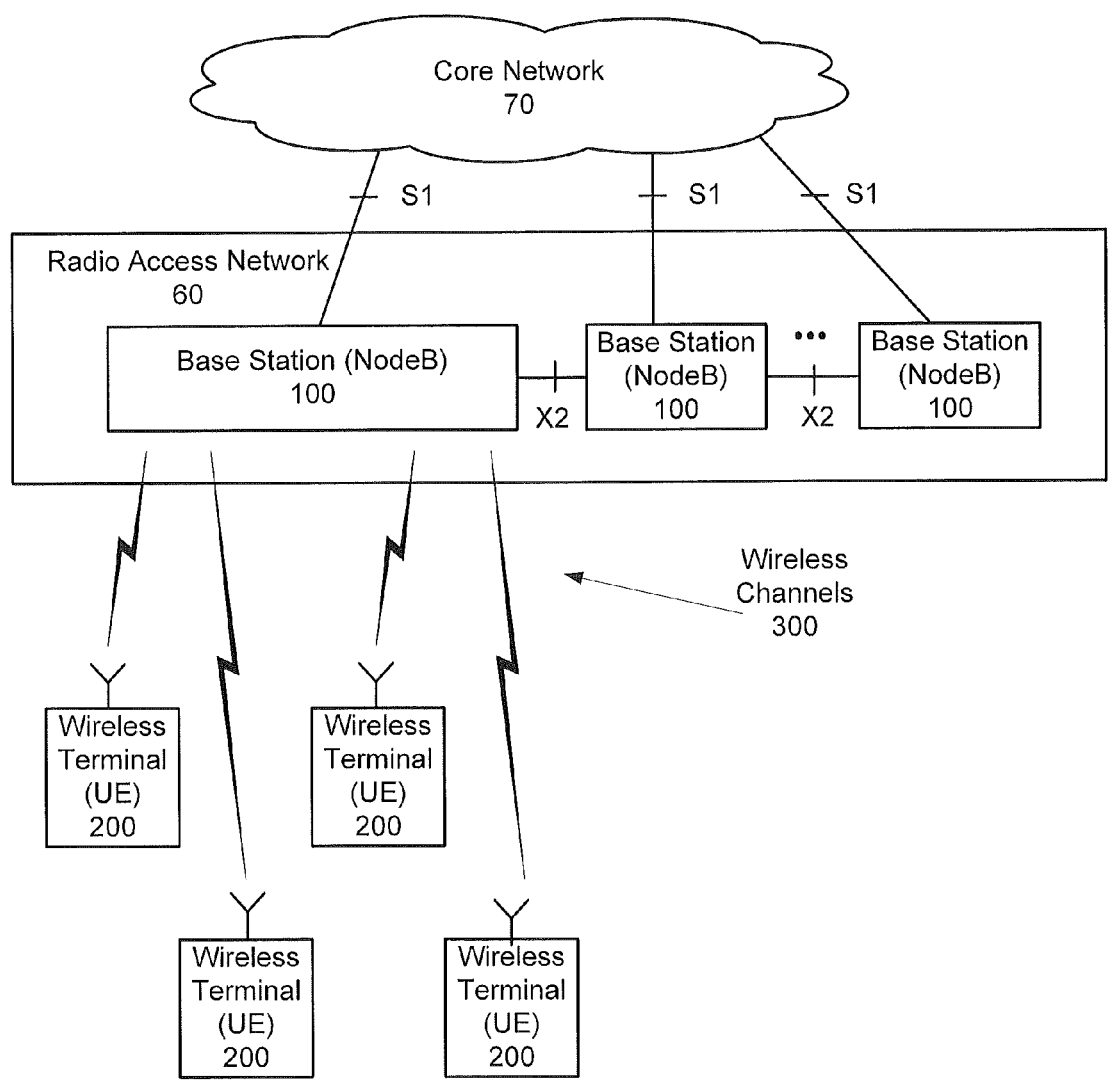
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as user equipment nodes or UEs). It will be understood, however, that the present invention is not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as NodeB, eNodeB, or Evolved Node B) and wireless terminal (also referred to as UE or User Equipment) should be considering non-limiting and does not imply a certain hierarchical relation between the two. In general a base station (e.g., an "NodeB") and a wireless terminal (e.g., a "UE") may be considered as examples of respective different communications devices that communicate with each other over a wireless radio channel. While embodiments discussed herein may focus on wireless transmissions in a downlink from an NodeB to a UE, embodiments of the invention may also be applied, for example, in the uplink.

FIG. 1 is a block diagram of a communication system that is configured to operate according to some embodiments of the present invention. An example RAN 60 is shown that may be a Long Term Evolution (LTE) RAN. Radio base stations (e.g., NodeBs) 100 may be connected directly to one or more core networks 70, and/or radio base stations 100 may be coupled to core networks 70 through one or more radio network controllers (RNC). In some embodiments, functionality of a radio network controller(s) may be performed by radio base stations 100. Radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
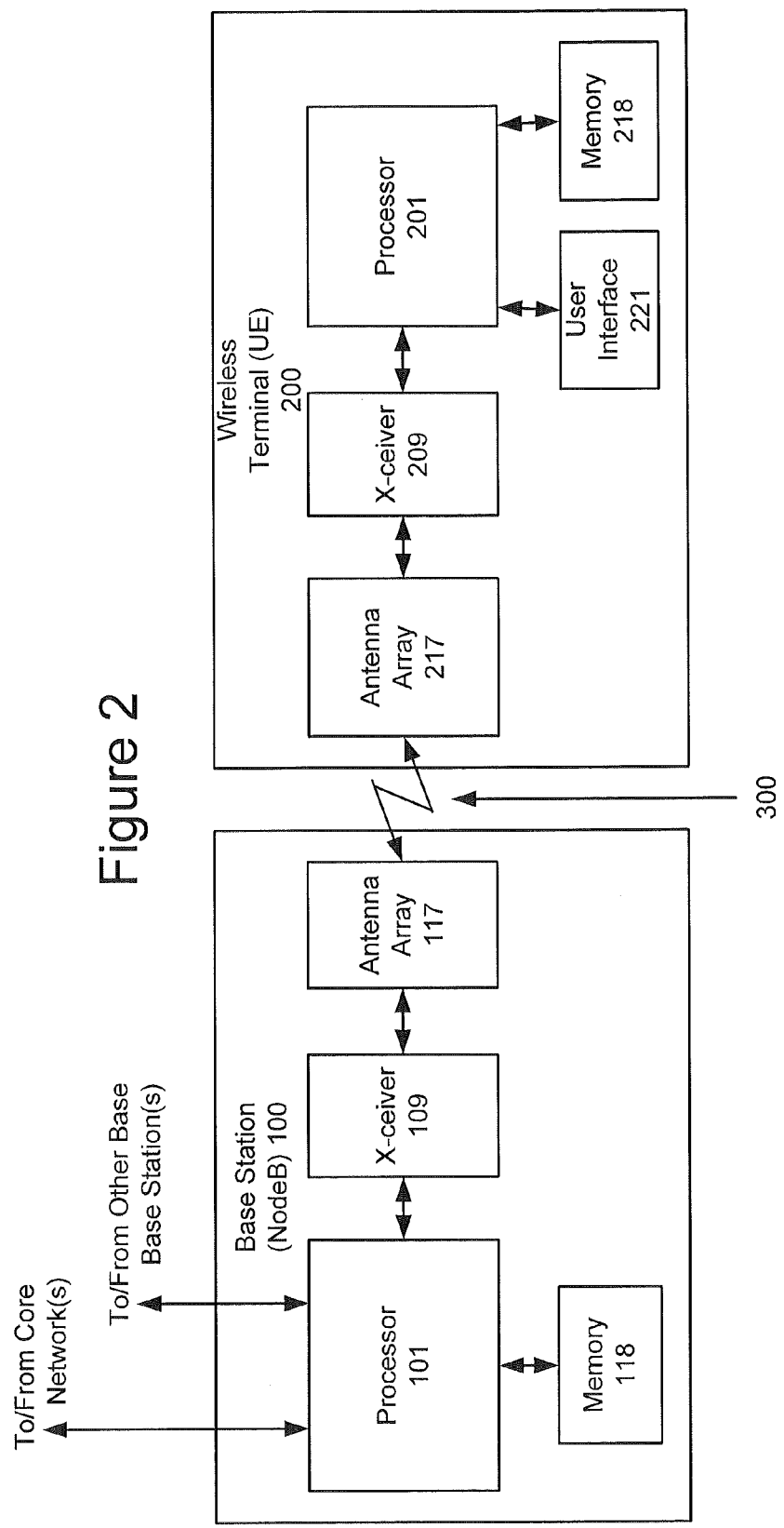
FIG. 2 is a block diagram illustrating a base station and a wireless terminal according to some embodiments of FIG. 1.

FIG. 2 is a block diagram of a base station 100 and a wireless terminal 200 of FIG. 1 in communication over wireless channel 300 according to some embodiments of the present invention. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. To support up to 4-branch MIMO (allowing parallel transmission of 4 layers/streams of data using a same TFRE), each of antenna arrays 117 and 217 may include four (or more) antenna elements. Wireless terminal 200 of FIG. 2, for example, may be a cellular radiotelephone, a smart phone, a laptop/netbook/tablet/handheld computer, or any other device providing wireless communications. User interface 211, for example, may include a visual display such as an liquid crystal display, a touch sensitive visual display, a keypad, a speaker, a microphone, etc.

For MIMO downlink transmissions from RAN 60 to wireless terminal 200, a codebook of precoding vectors (known at both RAN 60 and wireless terminal 200) is used to precode (e.g., to apply precoding weights to) the different data layers (data streams) that are transmitted in parallel from a sector antenna array(s) to the wireless terminal 200 during a same TFRE, and to decode the data layers (data streams) received in parallel during the same TFRE at wireless terminal 200. The same codebook of precoding vectors may be stored in wireless terminal memory 218 and in base station memory 118. Moreover, wireless terminal 200 may estimate characteristics of each downlink channel to generate channel quality information (CQI), and CQI feedback from wireless terminal 200 may be transmitted to base station 100. This CQI feedback may then be used by the base station processor 101 to select: transmission rank (i.e., a number of data layers/streams to be transmitted during a subsequent TFRE); transport data block length(s); channel code rate(s) to be used to channel encode different transport data blocks; modulation order(s) defining a number of bits mapped to a modulated symbol; symbol to layer mapping schemes; and/or precoding vectors for respective downlink transmissions to the wireless terminal 200.

By way of example, base station antenna array 117 may include 4 antennas and wireless terminal antenna array 217 may include four antennas so that wireless terminal 200 may receive up to four downlink data layers (data streams) from base station antenna array 117 during MIMO communications. In this example, the precoding codebook may include rank 1 precoding vectors (used when transmitting one downlink data stream from a base station sector antenna array 117 to wireless terminal 200), rank 2 precoding vectors (used when transmitting two downlink data streams from a base station sector antenna array 117 to wireless terminal 200), rank 3 precoding vectors (used when transmitting three downlink data streams from a base station sector antenna array 117 to wireless terminal 200), and rank 4 precoding vectors (used when transmitting four downlink data streams from a base station sector antenna array 117 to wireless terminal 200). Precoding vectors may also be referred to, for example, as precoding codebook entries, precoding codewords, and/or precoding matrices.

Wireless terminal 200 may transmit CQI/PCI information (over uplink control channel HS-DPCCH) including a rank indicator RI (requesting/recommending a MIMO transmission rank), a precoding control index PCI (requesting/recommending a precoding vector, also referred to as a precoding index), and a modulation/coding scheme (MCS) for subsequent downlink transmissions from base station 100 to wireless terminal 200. Base station processor 101 may select the requested/recommended MIMO rank/vector and/or MCS and/or a different MIMO rank/vector and/or MCS, and base station 100 may indentify the selected MIMO rank/vector and/or MCS in downlink signaling transmitted to wireless terminal 200. Base station 100 may then transmit one or more transport data blocks using respective MIMO layers/streams over the downlink channel in a subsequent TTI/TFRE in accordance with the selected MIMO rank/vector and/or MCS as downlink traffic.

Figure 3:
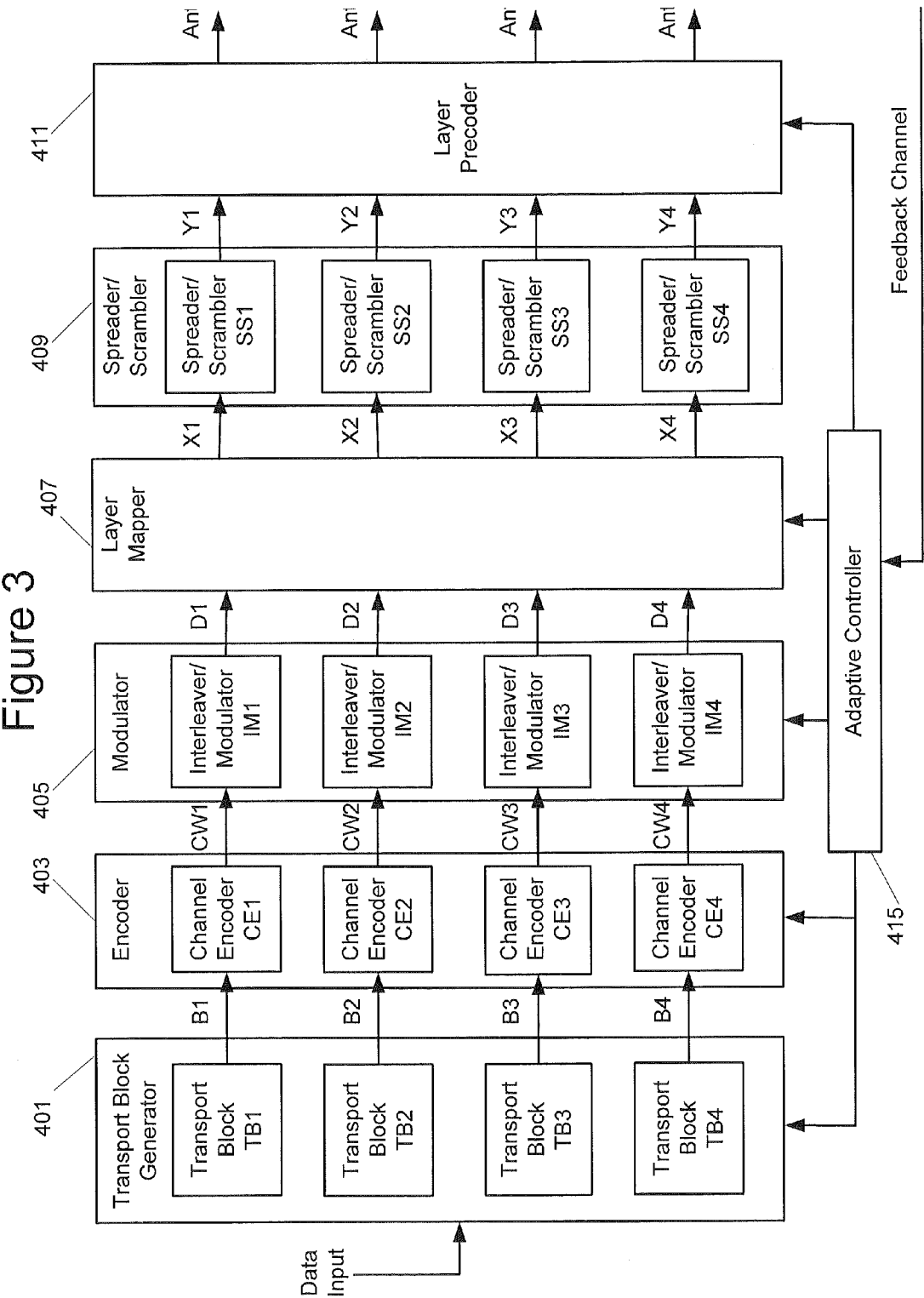
FIG. 3 is a block diagram illustrating elements/functionalities of base station processors according to some embodiments of FIG. 2.

FIG. 3 is block diagram illustrating elements/functionalities of base station processor 101 of FIG. 2 supporting two codeword MIMO with 2 channel encoders and up to four rank MIMO downlink transmission according to some embodiments. According to embodiments of FIG. 3, four channel encoders CE1, CE2, CE3, and CE4 may be provided for up to four streams of transport data blocks B1, B2, B3, and B4, with symbols of data input streams for wireless terminal 200 being mapped to respective data transmission layer/streams X1, X2, X3, and X4. As shown, processor 101 may include transport data block generator 401, channel encoder 403, modulator 405, layer mapper 407, spreader/scrambler 409, and layer precoder 411. In embodiments of FIG. 4, channel encoder 403 may include channel encoders CE1, CE2, CE3, and CE4 for four streams of transport data blocks B1, B2, B3, and B4, modulator 405 may include interleavers/modulators IM1, IM2, IM3, and IM4, and layer mapper 407 may be configured to map resulting symbols of the streams to respective MIMO layers (streams) X1, X2, X3, and X4 as discussed in greater detail below. Moreover, adaptive controller 415 may be configured to control transport data block generator 401, channel encoder 403, modulator 405, layer mapper 407, spreader/scrambler 409, and/or layer precoder 411 responsive to channel quality information (CQI) received as feedback from wireless terminal 200. According to some embodiments discussed herein, layer mapper 407 may perform a one-to-one mapping. Accordingly, symbols from interleavers/modulators IM1, IM2, IM3, and IM4 may each map directly to respective MIMO layers (streams) X1, X2, X3, and X4.

Base station processor 101, for example, may receive input data (e.g., from core network 70, from another base station, etc.) for transmission to wireless terminal 200, and transport data block generator 401 (including transport data block data generators TB1, TB2, TB3, and TB4) may provide a single stream of data blocks (for rank 1 transmissions), two streams of data blocks (for rank 2 transmissions), three streams of data (for rank 3 transmissions), and four streams of data (for rank 4 transmissions).

For rank 1 transmissions (providing only 1 MIMO layer/stream), all input data may be processed through transport data block generator TB1 to provide a single stream of transport data blocks B1 (including individual transport data blocks b1-1, b1-2, b1-3, etc.) without using transport data block generators TB2, TB3, and TB4 and without generating other layers/streams of transport data blocks B2, B3, and B4. For rank 2 transmissions (providing 2 MIMO layers/streams), transport data block generator TB1 may generate a layer/stream of transport data blocks B1 (including individual transport data blocks b1-1, b1-2, b1-3, etc.), and transport data block generator TB2 may generate a stream of transport data blocks B2 (including individual transport data blocks b2-1, b2-2, b2-3, etc.), without using transport data block generators TB3 and TB4 and without generating layers/streams of transport data blocks B3 and B4. For rank 3 transmissions (providing 3 MIMO layers/streams), transport data block generator TB1 may generate a layer/stream of transport data blocks B1 (including individual transport data blocks b1-1, b1-2, b1-3, etc.), transport data block generator TB2 may generate a stream of transport data blocks B2 (including individual transport data blocks b2-1, b2-2, b2-3, etc.), and transport data block generator TB3 may generate a stream of transport data blocks B3 (including individual transport data blocks b3-1, b3-2, b3-3, etc.) without using transport data block generator TB4 and without generating a fourth layer/stream of transport data block B4.

Channel encoder 403 (including channel encoders CE1, CE2, CE3, and CE4) may encode the stream/streams of data blocks B1, B2, B3, and/or B4 generated by transport data block generator 401 to provide respective streams of codewords CW1 (including individual codewords cw1-1, cw1-2, cw1-3, etc.), CW2 (including individual codewords cw2-1, cw2-2, cw2-3, etc.), CW3 (including individual codewords cw3-1, cw3-2, cw3-3, etc.), and CW4 (including individual codewords cw4-1, cw4-2, cw4-3, etc.), for example, using turbo coding, convolutional coding, etc. Moreover, coding characteristics (e.g., coding rates) applied by channel encoders CE1, CE2, CE3, and CE4 may be separately determined by adaptive controller 415 responsive to wireless terminal 200 feedback (e.g., CQI regarding the downlink channel). For rank 1 transmissions, channel encoder 403 may generate a single stream of codewords CW1 responsive to the stream of data blocks B1 using only channel encoder CE1. For rank 2 transmissions, channel encoder 403 may generate two streams of codewords CW1 and CW2 responsive to respective streams of data blocks B1 and B2 using channel encoder CE1 and channel encoder CE2. For rank 3 transmissions, channel encoder 403 may generate three streams of codewords CW1, CW2, and CW3 responsive to respective streams of data blocks B1, B2, and B3 using channel encoders CM, CE2, and CE3. For rank 4 transmissions, channel encoder 403 may generate four streams of codewords CW1, CW2, CW3, and CW4 responsive to respective streams of data blocks B1, B2, B3, and B4 using channel encoders CE1, CE2, CE3, and CE4. Channel encoder 403 may apply code rates responsive to input from adaptive controller 415 determined based on CQI feedback from wireless terminal 200.

According to some embodiments, the interleavers/modulators (i.e., IM1, IM2, IM3, and/or IM4) and/or the channel encoders (i.e., CE1, CE2, CE3, and/or CE4) may apply different modulation and/or coding characteristics (e.g., different modulation orders and/or coding rates) during rank 2, rank 3, and/or rank 4 transmissions to generate respective (differently coded) codewords including data to be transmitted during a same TFRE. For example, wireless terminal feedback for only two modulation and/or coding characteristics may be supported to reduce signaling overhead. For rank one transmissions, modulation and coding characteristics may be received for and applied to channel encoder CE1 and interleaver/modulator IM1. For rank two transmissions, first modulation and coding characteristics may be received for and applied to channel encoder CE1 and interleaver/modulator IM1, and second modulation and coding characteristics may be received for and applied to channel encoder CE1 and interleaver/modulator IM2. For rank three transmissions, first modulation and coding characteristics may be received for and applied to channel encoder CE1 and interleaver/modulator IM1, and second modulation and coding characteristics may be received for and applied to channel encoders CE2 and CE3 and interleavers/modulators IM2 and IM3. For rank four transmissions, first modulation and coding characteristics may be received for and applied to channel encoders CE1 and CE4 and interleavers/modulators IM1 and IM4, and second modulation and coding characteristics may be received for and applied to channel encoders CE2 and CE3 and interleavers/modulators IM2 and IM3.

Modulator 405 (including interleaver/modulators IM1, IM2, IM3, and IM4) may interleave and modulate the stream/streams of codewords CW1, CW2, CW3, and/or CW4 generated by channel encoder 403 to provide respective streams of unmapped symbol blocks D1 (including unmapped symbol blocks $d^{(1)}$-1, $d^{(1)}$-2, $d^{(1)}$-3, etc.), D2 (including unmapped symbol blocks $d^{(2)}$-1, $d^{(2)}$-2, $d^{(2)}$-3, etc.), D3 (including unmapped symbol blocks $d^{(3)}$-1, $d^{(3)}$-2, $d^{(3)}$-3, etc.), and D4 (including unmapped symbol blocks $d^{(4)}$-1, $d^{(4)}$-2, $d^{(4)}$-3, etc.). For rank 1 transmissions (providing only 1 MIMO layer/stream), modulator 405 may generate a single stream of unmapped symbol blocks D1 responsive to the stream of codewords CW1 using only interleaver/modulator IM1. For rank 2 transmissions, modulator 405 may generate two streams of unmapped symbol blocks D1 and D2 responsive to respective streams of codewords CW1 and CW2 using interleaver/modulators IM1 and IM2. For rank 3 transmissions, modulator 405 may generate three streams of unmapped symbol blocks D1, D2, and D3 responsive to respective streams of codewords CW1, CW2, and CW3 using interleaver/modulators IM1, IM2, and IM3. For rank 4 transmissions, modulator 405 may generate four streams of unmapped symbol blocks D1, D2, D3, and D4 responsive to respective streams of codewords CW1, CW2, CW3, and CW4 using interleaver/modulators IM1, IM2, IM3, and IM4. Modulator 405 may apply modulation orders responsive to input from adaptive controller 415 determined based on CQI feedback from wireless terminal 200.

In addition, each interleaver/modulator IM1, IM2, IM3, and/or IM4 may interleave data of two or more codewords of a stream so that two or more consecutive unmapped symbol blocks of a respective stream include symbols representing data of the two or more consecutive codewords. For example, data of consecutive codewords cw1-1 and cw1-2 of codeword stream CW1 may be interleaved and modulated to provide consecutive unmapped symbol blocks $d^{(1)}$-1 and $d^{(1)}$-2 of stream D1. Similarly, data of consecutive codewords cw2-1 and cw2-2 of codeword stream CW2 may be interleaved and modulated to provide consecutive unmapped symbol blocks $d^{(2)}$-1 and $d^{(2)}$-2 of stream D2.

Symbols of streams of unmapped symbol blocks D1, D2, D3, and D4 may be mapped to respective streams of mapped symbol blocks X1, X2, X3, and X4 (for respective MIMO transmission layers). For rank 1 transmissions, layer mapper 407 may map symbols of unmapped symbol blocks $d^{(1)}$ (from stream D1) directly to mapped symbol blocks $x^{(1)}$ of stream X1. For rank 2 transmissions, layer mapper 407 may map symbols of unmapped symbol blocks $d^{(1)}$ (from stream D1) directly to mapped symbol blocks $x^{(1)}$ of stream X1, and layer mapper 407 may map symbols of unmapped symbol blocks $d^{(2)}$ (from stream D2) directly to mapped symbol blocks $x^{(2)}$ of stream X2. For rank 3 transmissions, layer mapper 407 may map symbols of unmapped symbol blocks $d^{(1)}$ (from stream D1) directly to mapped symbol blocks $x^{(1)}$ of stream X1, layer mapper 407 may map symbols of unmapped symbol blocks $d^{(2)}$ (from stream D2) directly to mapped symbol blocks $x^{(2)}$ of stream X2, and layer mapper 407 may map symbols of unmapped symbol blocks $d^{(3)}$ (from stream D3) directly to mapped symbol blocks $x^{(3)}$ of stream X3. For rank 4 transmissions, layer mapper 407 may map symbols of unmapped symbol blocks $d^{(1)}$ (from stream D1) directly to mapped symbol blocks $x^{(1)}$ of stream X1, layer mapper 407 may map symbols of unmapped symbol blocks $d^{(2)}$ (from stream D2) directly to mapped symbol blocks $x^{(2)}$ of stream X2, layer mapper 407 may map symbols of unmapped symbol blocks $d^{(3)}$ (from stream D3) directly to mapped symbol blocks $x^{(3)}$ of stream X3, and layer mapper 407 may map symbols of unmapped symbol blocks $d^{(4)}$ (from stream D4) directly to mapped symbol blocks $x^{(4)}$ of stream X4.

Spreader/scrambler 409 may include four spreader/scramblers SS1, SS2, SS3, and SS4, and for each mapped symbol stream provided by layer mapper 407, spreader/scrambler 409 may generate a respective stream of spread symbol blocks Y1, Y2, Y3, and Y4 (e.g., using a Walsh code). Layer precoder 411 may apply a MIMO precoding vector (e.g., by applying precoding weights) of the appropriate rank (based on wireless terminal feedback as interpreted by adaptive controller 415) to the streams of spread symbol blocks for transmission through transceiver 109 and antennas Ant-1, Ant-2, Ant-3, and Ant-4 of antenna array 117.

In embodiments of FIG. 3, base station processor 101 may support 4 layer MIMO transmissions with four channel encoders CE1, CE2, CE3, and CE4 generating respective codeword streams CW1, CW2, CW3, and CW4. Using feedback from wireless terminal 200 (indicated by "feedback channel"), adaptive controller 415 may choose transport block length, modulation order, and coding rate (used by transport block generator 401, encoder 403, and/or modulator 405). Adaptive controller 415 may also identify precoding vectors (defining precoding weight information) used by layer precoder 411. Because feedback for only two modulation/coding schemes may be supported, a same modulation order and/or a same code rate may be applied to two transmission layers for rank 3 and rank 4 transmissions. For rank 1 transmissions, wireless terminal 200 may provide CQI including only one modulation order and only one code rate that are applied to the stream of codewords CW1 that are modulated and mapped directly to transmission layer X1. For rank 2 transmissions, wireless terminal 200 may provide CQI including a first modulation order and a first code rate that are applied to the stream of codewords CW1 that are modulated and mapped directly to transmission layer X1, and a second modulation order and a second code rate that are applied to the stream of codewords CW2 that are modulated and mapped directly to transmission layer X2. For rank 3 transmissions, wireless terminal 200 may provide CQI including a first modulation order and a first code rate that are applied to the stream of codewords CW1 that are modulated and mapped directly to transmission layer X1, and a second modulation order and a second code rate that are applied to second and third streams of codewords CW2 and CW3 that are modulated and mapped to transmission layers X2 and X3. For rank 4 transmissions, wireless terminal 200 may provide CQI including a first modulation order and a first code rate that are applied to the first and fourth streams of codewords CW1 and CW4 that are modulated and mapped to transmission layers X1 and X4, and a second modulation order and a second code rate that are applied to second and third streams of codewords CW2 and CW3 that are modulated and mapped to transmission layers X2 and X3. For rank 3 and rank 4 transmissions, a same modulation order and a same code rate (also referred to as modulation/coding scheme) may map to more than one transmission layer.

Based on the rank chosen by adaptive controller 415, transport data blocks may be passed to encoder 403, and encoder outputs may be interleaved and modulated using modulator 405. Outputs of modulator 405 may be mapped to space time layers using layer mapper 407. The symbol stream(s) generated by layer mapper 407 may be spread and scrambled using spreader/scrambler 409, and layer precoder 411 may precode outputs of spreader/scrambler 409, with precoder outputs being passed through transceiver 109 and antenna array 117 (including Antennas Ant-1, Ant-2, Ant-3, and Ant-4).

Figure 4:
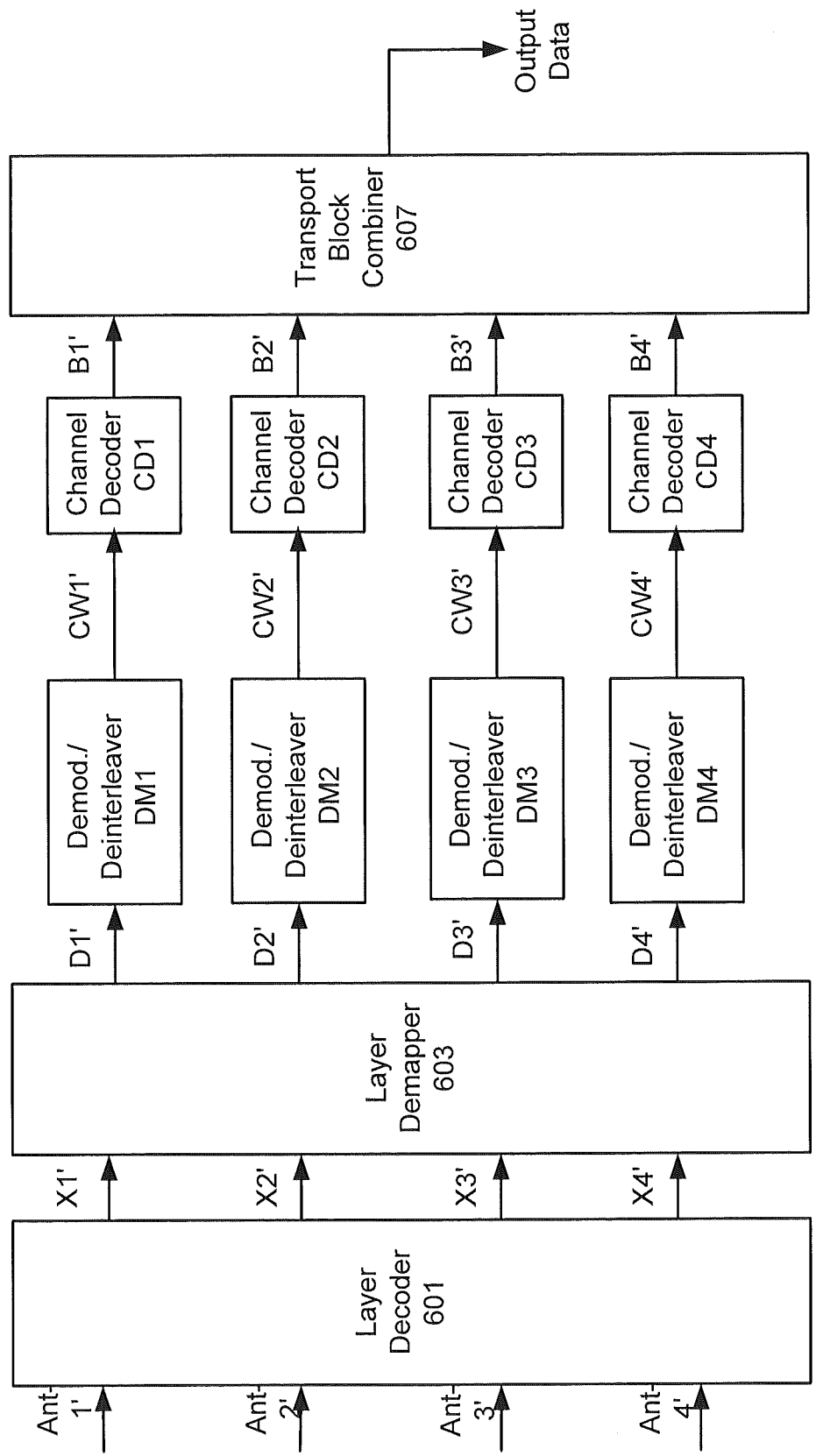
FIG. 4 is a block diagram illustrating elements/functionalities of wireless terminal processors according to some embodiments of FIG. 2.

At wireless terminal 200, operations of processor 201 may mirror operations of base station processor 101 when receiving the MIMO downlink communications transmitted by the base station. More particularly, elements/functionalities of wireless terminal processor 201 are illustrated in FIG. 4 mirroring elements/functionalities of base station processor 101 discussed above with reference to FIG. 3.

Radio signals may be received through MIMO antenna elements of MIMO antenna array 217 and transceiver 209, and the radio signals may be decoded by layer decoder 601 using a MIMO decoding vector to generate a plurality of MIMO decoded symbol layers X1', X2', X3', and/or X4' depending on MIMO rank used for transmission/reception. Layer Decoder 601 may use a decoding vector corresponding to the precoding vector used by base station 100. Layer decoder 601 may generate a single decoded symbol layer X1' for rank 1 reception, layer decoder 601 may generate two decoded symbol layers X1' and X2' for rank 2 reception, layer decoder 601 may generate three decoded symbol layers X1', X2', and X3' for rank 3 reception, and layer decoder 601 may generate four decoded symbol layers X1', X2', X3', and X4' for rank 4 transmission. Layer decoder 601 may thus perform a converse of operations performed by layer precoder 411 and spreader/scrambler 409 of base station 100. Layer decoder 601 may perform functionalities of a MIMO detector (corresponding to a converse of layer precoder 411) and of dispreading/descrambling blocks for each data stream/layer (corresponding to a converse of spreader/scrambler 409). Layer demapper 603 may function as a converse of layer mapper 407 to demap decoded symbol layers X1', X2', X3', and/or X4' directly to respective unmapped symbol layers D1', D2', D3', and D4' according to the transmission rank.

For rank one reception, layer demapper 603 may demap symbols of decoded symbol layer X1' blocks $x^{(1)'}$-j directly to symbols of unmapped symbol layer D1' blocks $d^{(1)'}$-j, demodulator/deinterleaver DM-1 may demodulate/deinterleave unmapped symbol layer blocks $d^{(1)'}$-j to provide codewords cw1'-j of codeword stream CW1', and channel decoder CD1 may decode codewords cw1'-j of codeword stream CW1' to provide transport blocks b1'-j of stream B1'. Transport block generator 607 may then pass transport blocks b1'-j of stream B1' as a data stream. During rank one reception, demodulators/deinterleavers DM2, DM3, and DM4 and channel decoder CD2, CD3, and CD4 may be unused.

For rank two reception, layer decoder 601 may generate decoded symbol layers X1' and X2'. Layer demapper 603 may demap symbols of decoded symbol layer X1' blocks $x^{(1)'}$-j directly to symbols of unmapped symbol layer D1' blocks $d^{(1)'}$-j, and layer demapper 603 may demap symbols of decoded symbol layer X2' blocks $x^{(2)'}$-j directly to symbols of unmapped symbol layer D2' blocks $d^{(2)'}$-j. Demodulator/deinterleaver DM-1 may demodulate/deinterleave unmapped symbol layer blocks $d^{(1)'}$-j to provide codewords cw1-j of codeword stream CW1', and demodulator/deinterleaver DM-2 may demodulate/deinterleave unmapped symbol layer blocks $d^{(2)'}$-j to provide codewords cw2'-j of codeword stream CW2'. Channel decoder CD1 may decode codewords cw1-j of codeword stream CW1' to provide transport blocks b1'-j of stream B1', and channel decoder CD2 may decode codewords cw2'-j of codeword stream CW2' to provide transport blocks b2'-j of stream B2'. Transport block generator 607 may then combine transport blocks b1'-j and b2'-j of streams B1' and B2' as a data stream. During rank two reception, demodulators/deinterleavers DM3 and DM4 and channel decoder CD3 and CD4 may be unused.

For rank three reception, layer decoder 601 may generate decoded symbol layers X1', X2', and X3'. Layer demapper 603 may demap symbols of decoded symbol layer X1' blocks $x^{(1)'}$-j directly to symbols of unmapped symbol layer D1' blocks $d^{(1)'}$-j, layer demapper 603 may demap symbols of decoded symbol layer X2' blocks $x^{(2)'}$-j directly to symbols of unmapped symbol layer D2' blocks $d^{(2)'}$-j, and layer demapper 603 may demap symbols of decoded symbol layer X3' blocks $x^{(3)'}$-j directly to symbols of unmapped symbol layer D3' blocks $d^{(3)'}$-j. Demodulator/deinterleaver DM-1 may demodulate/deinterleave unmapped symbol layer blocks $d^{(1)'}$-j to provide codewords cw1'-j of codeword stream CW1', demodulator/deinterleaver DM-2 may demodulate/deinterleave unmapped symbol layer blocks $d^{(2)'}$-j to provide codewords cw2'-j of codeword stream CW2', and demodulator/deinterleaver DM-3 may demodulate/deinterleave unmapped symbol layer blocks $d^{(3)'}$-j to provide codewords cw3'-j of codeword stream CW3'. Channel decoder CD1 may decode codewords cw1'-j of codeword stream CW1' to provide transport blocks b1'-j of stream B1', channel decoder CD2 may decode codewords cw2'-j of codeword stream CW2' to provide transport blocks b2'-j of stream B2', and channel decoder CD3 may decode codewords cw3'-j of codeword stream CW3' to provide transport blocks b3'-j of stream B3'. Transport block generator 607 may then combine transport blocks b1'-j, b2'-j, and b3'-j of streams B1', B2', and B3' as a data stream.

For rank four reception, layer decoder 601 may generate decoded symbol layers X1', X2', X3', X4'. Layer demapper 603 may demap symbols of decoded symbol layer X1' blocks $x^{(1)'}$-j to symbols of unmapped symbol layer D1' blocks $d^{(1)'}$-j, layer demapper 603 may demap symbols of decoded symbol layer X2' blocks $x^{(2)'}$-j to symbols of unmapped symbol layer D2' blocks $d^{(2)'}$-j, layer demapper 603 may demap symbols of decoded symbol layer X3' blocks $x^{(3)'}$-j to symbols of unmapped symbol layer D3' blocks $d^{(3)'}$-j, and layer demapper 603 may demap symbols of decoded symbol layer X4' blocks $x^{(4)'}$-j to symbols of unmapped symbol layer D4' blocks $d^{(4)'}$-j. Demodulator/deinterleaver DM-1 may demodulate/deinterleave unmapped symbol layer blocks $d^{(1)'}$-j to provide codewords cw1'-j of codeword stream CW1', demodulator/deinterleaver DM-2 may demodulate/deinterleave unmapped symbol layer blocks $d^{(2)'}$-j to provide codewords cw2'-j of codeword stream CW2', demodulator/deinterleaver DM-3 may demodulate/deinterleave unmapped symbol layer blocks $d^{(3)'}$-j to provide codewords cw3'-j of codeword stream CW3', and demodulator/deinterleaver DM-4 may demodulate/deinterleave unmapped symbol layer blocks $d^{(4)'}$-j to provide codewords cw4'-j of codeword stream CW4'. Channel decoder CD1 may decode codewords cw1'-j of codeword stream CW1' to provide transport blocks b1'-j of stream B1', channel decoder CD2 may decode codewords cw2'-j of codeword stream CW2' to provide transport blocks b2'-j of stream B2', channel decoder CD3 may decode codewords cw3'-j of codeword stream CW3' to provide transport blocks b3'-j of stream B3', and channel decoder CD4 may decode codewords cw4'-j of codeword stream CW4' to provide transport blocks b4'-j of stream B4'. Transport block generator 607 may then combine transport blocks b1'-j, b2'-j, b3'-j, and b4'-j of streams B1', B2', B3', and B4' as a data stream.

Figure 5:
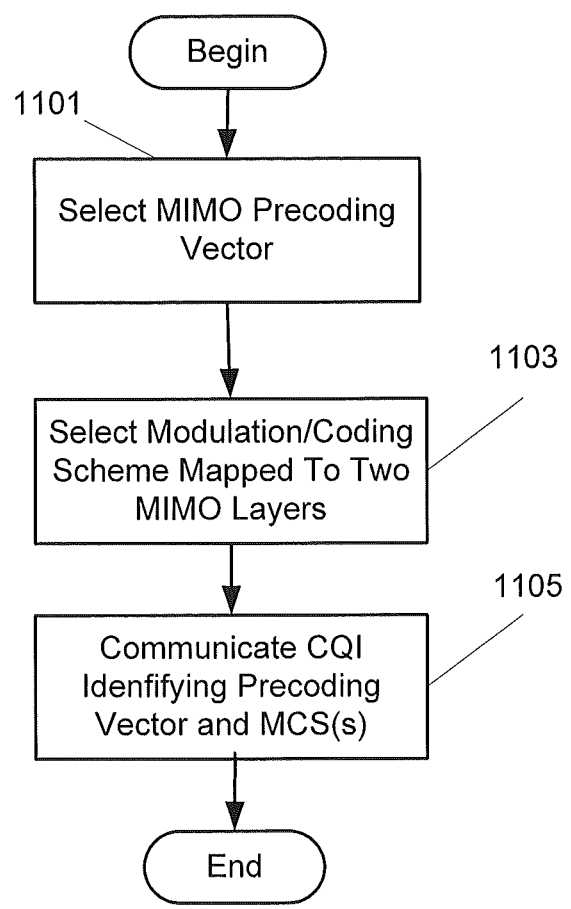
FIG. 5 is a flow chart illustrating operations of selecting channel quality information according to some embodiments of the present invention.

FIG. 5 is a flow chart illustrating operations of wireless terminal 200 (also referred to as user equipment node or user equipment 200) according to some embodiments of the present invention. At block 1101, processor 201 may select a multiple-input-multiple-output, MIMO, rank and a MIMO precoding entity from a codebook of MIMO precoding entities for a downlink communication from the base station (100) to the user equipment. According to some embodiments of the present invention, wireless terminal 200 and base station 200 may support up to four layer MIMO downlink reception using a precoder codebook including 16 precoding entities (also referred to as precoding vectors) for each rank/layer for a total of 64 precoding entities. At block 1103, processor 201 may select a modulation/coding scheme to be mapped to first and second MIMO layers of the downlink communication using the MIMO precoding entity selected from the precoder codebook. At block 1105, processor 201 may then communicate channel quality information identifying the MIMO precoding entity and the modulation/coding scheme from the wireless terminal 200 to the base station 100. More particularly, processor 201 may communicate the channel quality information by transmitting the channel quality information through transceiver 209 and antenna array 217 to base station 100.

If processor 201 selects MIMO rank 3 transmission, the modulation/coding scheme may be mapped to channel encoders CE2 and CE3 and/or to interleaver/modulators IM2 and IM3, and another modulation/coding scheme may be selected using the MIMO precoding entity and mapped to channel encoder CE1 and/or to interleaver/modulator IM1. If processor 201 selects MIMO rank 4 transmission, the modulation/coding scheme may be mapped to channel encoders CE2 and CE3 and/or to interleaver/modulators IM2 and IM3, and another modulation/coding scheme may be selected using the MIMO precoding entity and mapped to channel encoders CE1 and CE4 and/or to interleavers/modulators IM1 and IM4. Accordingly, the channel quality information may identifying the MIMO precoding entity and both modulation/coding schemes.

FIG. 6 is a flow chart illustrating operations of wireless terminal 200 according to some other embodiments of the present invention. More particularly, operations of selecting a MIMO precoding vector of block 1101 of FIG. 5 may be performed according to operations of blocks 1201 to 1207 of FIG. 6, and operations of selecting a modulation/coding scheme mapped to two MIMO layers of block 1103 of FIG. 5 may be performed according to operations of blocks 1208 to 1219 of FIG. 6.

At block 1201, processor 201 may provide an estimate of the downlink channel 300 responsive to pilot signals received from the base station 100. The pilot signals may be received at processor 201 from base station 100 through antenna array 217 and transceiver 209 and processed to provide estimates of the downlink channel (e.g., to provide channel coefficients). As discussed above, wireless terminal 200 may support reception of up to 4 downlink transmission layers, and the precoding codebook may include 64 precoding entities, with 16 precoding entities provided for each of the 4 downlink transmission layers/ranks. In the tables of FIGS. 7A to 7D, the precoding entities/indices are identified as $P_{i,j}$, where i indicates the rank and j indicates the index within the rank. At block 1203, processor 201 may use the estimate of the downlink channel to estimate signal strengths (e.g., signal to noise ratios or SNRs) $S_{i,k,j}$ for each applicable layer of each precoding entity $P_{i,j}$, where i indicates the rank, k indicates the layer, and j indicates the index within the rank. As shown in FIG. 7A, one signal strength is estimated for each rank 1 precoding vector because rank 1 supports 1 MIMO transmission/reception layer. As shown in FIG. 7B, two signal strengths are estimated for each rank 2 precoding vector because rank 2 supports 2 MIMO transmission/reception layers. As shown in FIG. 7C, three signal strengths are estimated for each rank 3 precoding vector because rank 3 supports 3 MIMO transmission/reception layers. As shown in FIG. 7D, four signal strengths are estimated for each rank 4 precoding vector because rank 4 supports 4 MIMO transmission/reception layers.

At block 1205, processor 201 may estimate capacities for the precoding entities of the codebook using the signal strengths of FIGS. 7A to 7D to provide the capacities $C_{i,j}$ of FIGS. 8A to 8D corresponding to the respective precoding entities $P_{i,j}$, where i indicates the rank, and j indicates the index within the rank. More particularly, a capacity for each layer of each precoding entity may be calculated using the respective signal strength (e.g., SNR) from the tables of FIGS. 7A to 7D where the capacity for each layer may be calculated as:

$C = \log 2(1+SNR)$, and the capacity of a precoding entity may be calculated by summing the capacities of its respective layers. Accordingly, the capacity $C_{1,j}$ of each rank one precoding entity $P_{i,j}$ may be calculated as:

$C_{1,j} = \log 2(1+S_{1,1,j})$.

The capacity $C_{2,j}$ of each rank two precoding entity $P_{2,j}$ may be calculated as:

$C_{2,j} = \log 2(1+S_{2,1,j}) + \log 2(1+S_{2,2,j})$.

The capacity $C_{3,j}$ of each rank two precoding entity $P_{3,j}$ may be calculated as:

$C_{3,j} = \log 2(1+S_{3,1,j}) + \log 2(1+S_{3,2,j}) + \log 2(1+S_{3,3,j})$.

The capacity $C_{4,j}$ of each rank two precoding entity $P_{4,j}$ may be calculated as:

$C_{4,j} = \log 2(1+S_{4,1,j}) + \log 2(1+S_{4,2,j}) + \log 2(1+S_{4,3,j}) + \log 2(1+S_{4,4,j})$.

At block 1207, processor 201 may select the precoding rank and precoding entity based on the capacities of FIGS. 8A to 8D. For example, processor 201 may select the rank and precoding entity corresponding to the highest/greatest capacity $C_{i,j}$. Stated in other words, processor 201 may select the rank and precoding entity to increase/maximize capacity $C_{i,j}$.

Depending on the rank at block 1208, processor 201 may select a modulation/coding scheme according to one of blocks 1209, 1211, 1215, and/or 1219. For rank 1 at block 1209, one modulation/coding scheme MCS1 is selected mapping to only one transmission/reception layer (e.g., including channel encoder CE1, interleaver/modulator IM1, demodulator/deinterleaver DM1, and/or channel decoder CD1), and processor 201 may select modulation/coding scheme MCS1 using the respective layer 1 signal strength $S_{1,1,j}$ corresponding to the selected precoding entity $P_{1,j}$. As shown in FIG. 9, for rank 1, a first modulation/coding scheme MCS1 is chosen as a function of $S_{1,1,j}$.

For rank 2 at block 1211, first and second modulation/coding schemes MCS1 and MCS2 are selected. The first modulation/coding scheme MCS1 maps to a first transmission/reception layer (e.g., including channel encoder CE1, interleaver/modulator IM1, demodulator/deinterleaver DM1, and/or channel decoder CD1), and processor 201 may select modulation/coding scheme MCS1 using the respective layer 1 signal strength $S_{2,1,j}$ corresponding to the selected precoding entity $P_{2,j}$. The second modulation/coding scheme MCS2 maps to a second transmission/reception layer (e.g., including channel encoder CE2, interleaver/modulator IM2, demodulator/deinterleaver DM2, and/or channel decoder CD2), and processor 201 may select modulation/coding scheme MCS2 using the respective layer 2 signal strength $S_{2,2,j}$ corresponding to the selected precoding entity $P_{2,j}$. As shown in FIG. 9, for rank 2, a first modulation/coding scheme MCS1 is chosen as a function of $S_{2,1,j}$, and a second modulation/coding scheme MCS2 is chosen as a function of $S_{2,2,j}$.

For rank 3 at block 1215, first and second modulation/coding schemes MCS1 and MCS2 are selected. The first modulation/coding scheme MCS1 maps to a first transmission/reception layer (e.g., including channel encoder CE1, interleaver/modulator IM1, demodulator/deinterleaver DM1, and/or channel decoder CD1), and processor 201 may select modulation/coding scheme MCS1 using the respective layer 1 signal strength $S_{3,1,j}$ corresponding to the selected precoding entity $P_{3,j}$. The second modulation/coding scheme MCS2 maps to second and third transmission/reception layer (e.g., including channel encoders CE2/CE3, interleavers/modulators IM2/IM3, demodulators/deinterleavers DM2/DM3, and/or channel decoders CD2/CD3), and processor 201 may select modulation/coding scheme MCS2 using (e.g., as a function of) the respective layer 2 and/or 3 signal strengths $S_{3,2,j}$ and/or $S_{3,3,j}$ corresponding to the selected precoding entity $P_{3,j}$. As shown in FIG. 9, for rank 3, a first modulation/coding scheme MCS1 is chosen as a function of and a second modulation/coding scheme MCS2 is chosen as a function of $S_{3,2,j}$ and/or $S_{3,3,j}$. By way of example, the second modulation/coding scheme MCS2 may be selected responsive to (e.g., as a function of): an average of $S_{3,2,j}$ and/or $S_{3,3,j}$ corresponding to the selected precoding entity $P_{3,j}$; a maximum of $S_{3,2,j}$ and/or $S_{3,3,j}$ corresponding to the selected precoding entity $P_{3,j}$; and/or a minimum of $S_{3,2,j}$ and/or $S_{3,3,j}$ corresponding to the selected precoding entity $P_{3,j}$.

The MIMO rank and precoding entity selected at block 1207 and the modulation/coding scheme(s) selected at block 1209/1211/1215/1219 may then be included in channel quality information CQI that is transmitted to base station 100 at block 1105.

Figure 10:
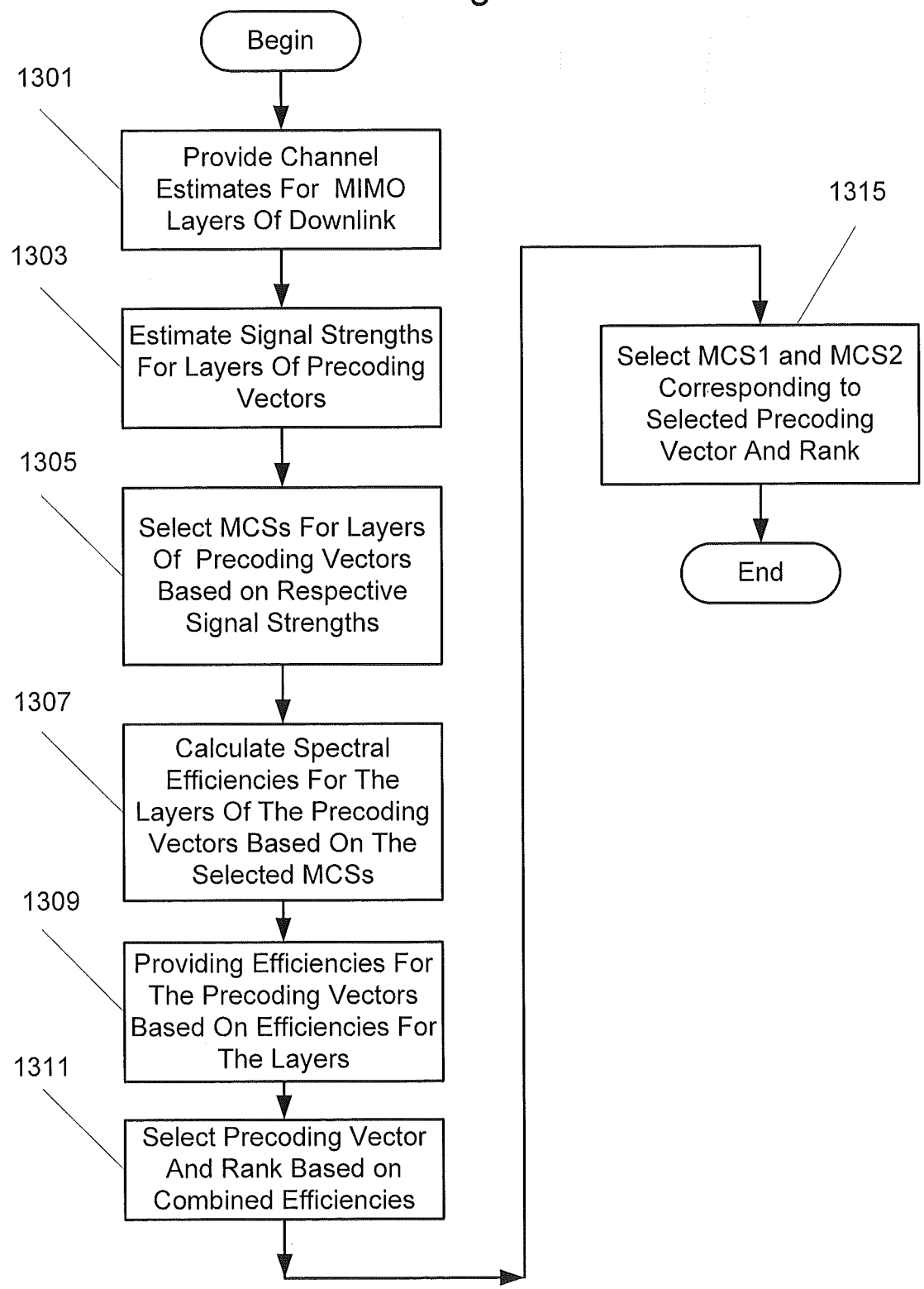
FIG. 10 is a flow chart illustrating operations of selecting channel quality information according to some embodiments of FIG. 6.

FIG. 10 is a flow chart illustrating operations of wireless terminal 200 according to some other embodiments of the present invention. More particularly, operations of selecting a MIMO precoding vector of block 1101 of FIG. 5 may be performed according to operations of blocks 1301 to 1311 of FIG. 10, and operations of selecting a modulation/coding scheme mapped to two MIMO layers of block 1103 of FIG. 5 may be performed according to operations of block 1315 of FIG. 10.

At block 1301, processor 201 may provide an estimate of the downlink channel 300 responsive to pilot signals received from the base station 100. The pilot signals may be received at processor 201 from base station 100 through antenna array 217 and transceiver 209 and processed to provide estimates of the downlink channel (e.g., to provide channel coefficients). As discussed above, wireless terminal 200 may support reception of up to 4 downlink transmission layers, and the precoding codebook may include 64 precoding entities, with 16 precoding entities provided for each of the 4 downlink transmission layers/ranks. In the tables of FIGS. 7A to 7D, the precoding entities/indices are identified as $P_{i,j}$ where i indicates the rank and j indicates the index within the rank. At block 1303, processor 201 may use the estimate of the downlink channel to estimate signal strengths (e.g., signal to noise ratios or SNRs) $S_{i,k,j}$ for each applicable layer of each precoding entity $P_{i,j}$, where i indicates the rank, k indicates the layer, and j indicates the index within the rank.

At block 1305, processor 101 may select a respective modulation/coding scheme $M_{i,k,j}$ for each of the relevant layers k of each of the MIMO precoding entities $P_{i,j}$ of the codebook as shown in FIGS. 13A to 13D responsive to the respective signal strengths $S_{i,k,j}$ of FIGS. 7A to 7D (e.g., using lookup tables). For each rank 1 precoding entity $P_{i,j}$, one modulation/coding scheme $M_{1,1,j}$ is selected responsive to the respective signal strength $S_{i,k,j}$. For each rank 2 precoding entity $P_{2,j}$, two modulation/coding schemes $M_{2,1,j}$ and $M_{2,2,j}$ are selected responsive to the respective signal strengths $S_{2,1,j}$ and $S_{2,1,k}$. For each rank 3 precoding entity $P_{3,j}$, three modulation/coding schemes $M_{3,1,j}$, $M_{3,2,j}$, and $M_{3,3,j}$ are selected responsive to the respective signal strengths $S_{3,1,j}$, $S_{3,2,j}$, and $S_{3,3,j}$. For each rank 4 precoding entity $P_{4,j}$, four modulation/coding schemes $M_{4,1,j}$, $M_{4,2,j}$, $M_{4,3,j}$, and $M_{4,4,j}$ are selected responsive to the respective signal strengths $S_{4,1,j}$, $S_{4,2,j}$, $S_{4,3,j}$, and $S_{4,4,j}$.

At block 1307, processor 201 calculates a respective spectral efficiency $E_{i,k,j}$ (also referred to as a layer efficiency) for each of the layers k of each of the MIMO precoding entities $P_{i,j}$ of the codebook responsive to the respective modulation/coding schemes $M_{i,k,j}$ of FIGS. 13A to 13D. Spectral efficiencies $E_{i,k,j}$ of each of the layers are illustrated in FIGS. 14A to 14D. Each spectral efficiency $E_{i,k,j}$ may be calculated as:

$E = \log 2(M)R$, where M is the number of constellation points in the selected modulation/coding scheme and R is the code rate of the selected modulation/coding scheme.

At block 1309, processor 201 may provide a respective precoding entity spectral efficiency $SE_{i,j}$ for each of the MIMO precoding entities of the codebook responsive to the layer efficiencies of the respective MIMO precoding entities as shown in FIGS. 15A to 15D. Each precoding spectral efficiency $SE_{i,j}$ may be calculated as discussed below with respect to FIG. 11A or as discussed below with respect to FIG. 11B.

Figure 11A:
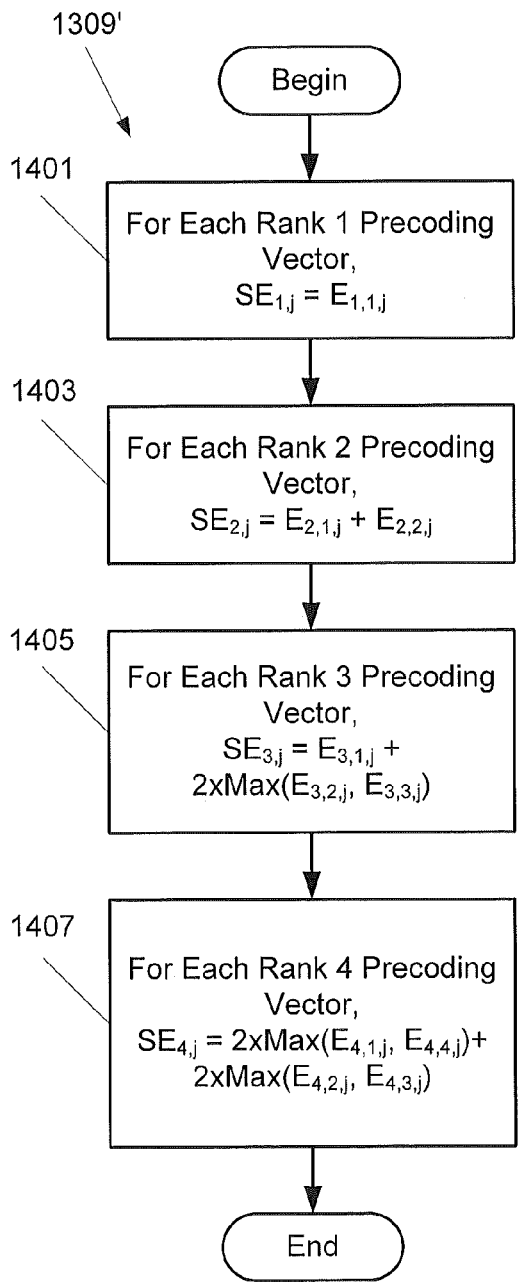
FIGS. 11A and 11B are flow charts illustrating operations of providing precoder vector efficiencies according to some embodiments of FIG. 10.

As shown in FIG. 11A, a maximum spectral efficiency may be selected for two layers sharing a modulation/coding scheme for ranks 3 and 4. For rank one precoding entities $P_{1,j}$ at block 1401, processor 201 may calculate precoding entity spectral efficiencies $SE_{1,j}$ as a function of the respective layer 1 efficiency $E_{1,1,j}$ as follows:

$SE_{1,j} = E_{1,1,j} = \log 2(M_{1,1,j})R_{1,1,j}$.

For rank two precoding entities $P_{2,j}$ at block 1403, processor 201 may calculate precoding entity spectral efficiencies $SE_{2,j}$ as a function of the respective layer 1 and 2 efficiencies $E_{2,1,j}$ and $E_{2,2,j}$ as follows:

$SE_{2,j} = E_{2,1,j} + E_{2,2,j} = \log 2(M_{2,1,j})R_{2,1,j} + \log 2(M_{2,2,j})R_{2,2,j}$.

For rank three precoding entities $P_{3,j}$ at block 1405, processor 201 may calculate precoding entity spectral efficiencies $SE_{3,j}$ as a function of the respective layer 1, 2, and 3 efficiencies $E_{3,1,j}$, $E_{3,2,j}$, and $E_{3,3,j}$ as follows:

$SE_{3,j} = E_{3,1,j} + 2*\text{Max}(E_{3,2,j}, E_{3,3,j})$ $= \log 2(M_{3,1,j})R_{3,1,j} +$ $2*\text{Max}[\log 2(M_{3,2,j})R_{3,2,j}, \log 2(M_{3,3,j})R_{3,3,j}]$.

For rank four precoding entities $P_{4,j}$ at block 1407, processor 201 may calculate precoding entity spectral efficiencies $SE_{4,j}$ as a function of the respective layer 1, 2, 3, and 4 efficiencies $E_{4,1,j}$, $E_{4,2,j}$, $E_{4,3,j}$, and $E_{4,4,j}$ as follows:

$SE_{3,j} = 2*\text{Max}(E_{4,1,j}, E_{4,4,j}) + 2*\text{Max}(E_{4,2,j}, E_{4,3,j})$ $= 2*\text{Max}[\log 2(M_{4,1,j})R_{4,1,j}, \log 2(M_{4,4,j})R_{4,4,j}] +$ $2*\text{Max}[\log 2(M_{4,2,j})R_{4,2,j}, \log 2(M_{4,3,j})R_{4,3,j}]$.

Figure 11B:
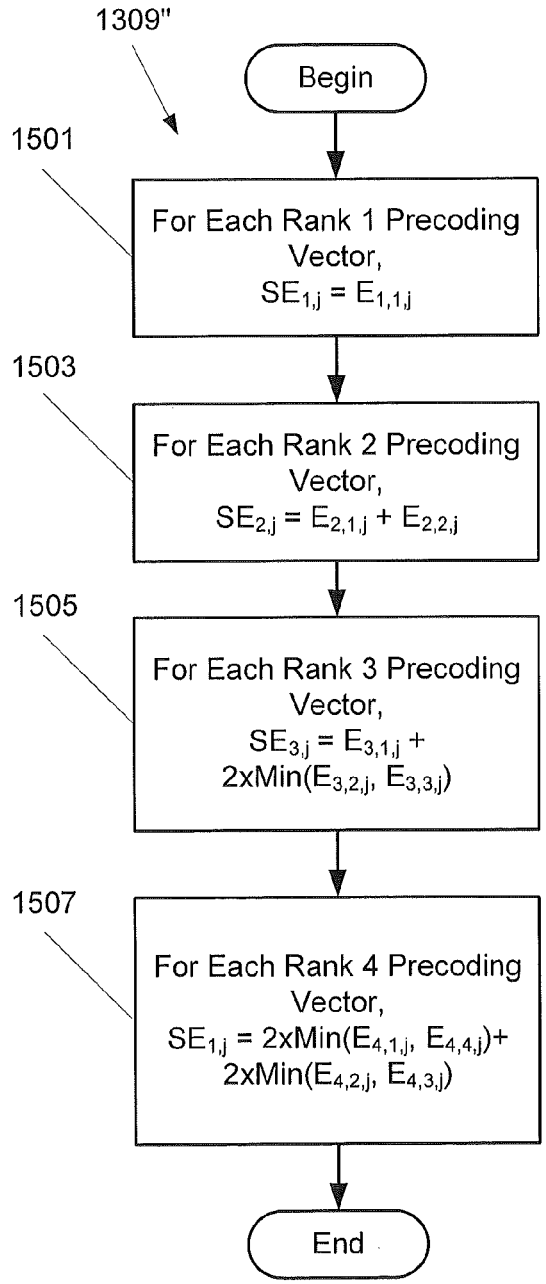

As shown in FIG. 11B, a minimum spectral efficiency may be selected for two layers sharing a modulation/coding scheme for ranks 3 and 4. For rank one precoding entities $P_{1,j}$ at block 1501, processor 201 may calculate precoding entity spectral efficiencies $SE_{1,j}$ as a function of the respective layer 1 efficiency $E_{1,1,j}$ as follows:

$SE_{1,j} = E_{1,1,j} = \log(M_{1,1,j})R_{1,1,j}$.

For rank two precoding entities $P_{2,j}$ at block 1503, processor 201 may calculate precoding entity spectral efficiencies $SE_{2,j}$ as a function of the respective layer 1 and 2 efficiencies $E_{2,1,j}$ and $E_{2,2,j}$ as follows:

$SE_{2,j} = E_{2,1,j} + E_{2,2,j} = \log 2(M_{2,1,j})R_{2,1,j} + \log 2(M_{2,2,j})R_{2,2,j}$.

For rank three precoding entities $P_{3,j}$ at block 1505, processor 201 may calculate precoding entity spectral efficiencies $SE_{3,j}$ as a function of the respective layer 1, 2, and 3 efficiencies $E_{3,1,j}$, $E_{3,2,j}$, and $E_{3,3,j}$ as follows:

$SE_{3,j} = E_{3,1,j} + 2*\text{Min}(E_{3,2,j}, E_{3,3,j})$ $= \log 2(M_{3,1,j})R_{3,1,j} +$ $2*\text{Min}[\log 2(M_{3,2,j})R_{3,2,j}, \log 2(M_{3,3,j})R_{3,3,j}]$.

For rank four precoding entities $P_{4,j}$ at block 1507, processor 201 may calculate precoding entity spectral efficiencies $SE_{4,j}$ as a function of the respective layer 1, 2, 3, and 4 efficiencies $E_{4,1,j}$, $E_{4,3,j}$, $E_{4,3,j}$, and $E_{4,4,j}$ as follows:

$SE_{3,j} = 2*\text{Min}(E_{4,1,j}, E_{4,4,j}) + 2*\text{Min}(E_{4,2,j}, E_{4,3,j})$ $= 2*\text{Min}[\log 2(M_{4,1,j})R_{4,1,j}, \log 2(M_{4,4,j})R_{4,4,j}] +$ $2*\text{Min}[\log 2(M_{4,2,j})R_{4,2,j}, \log 2(M_{4,3,j})R_{4,3,j}]$.

At block 1311, processor 201 may select a MIMO rank and precoding entity responsive to the combined efficiencies $SE_{i,j}$ provided at block 1309 and FIGS. 15A to 15D. More particularly, processor 201 may select the MIMO rank and precoding entity $P_{i,j}$ corresponding to the highest combined efficiency $SE_{i,j}$ calculated at block 1309. At block 1315, processor 201 may select one modulation/coding scheme MCS1 for rank 1 or two modulation/coding schemes MCS1 and MCS2 for rank 2, 3, and 4 corresponding to the selected MIMO rank and precoding entity. If operations of FIG. 11A are used to provide the combined efficiencies at block 1309, operations of FIG. 12A may be used to select the modulation/coding scheme(s) at block 1315. If operations of FIG. 11B are used to provide the combined efficiencies at block 1309, operations of FIG. 12B may be used to select the modulation/coding scheme(s) at block 1315.

Figure 12A:
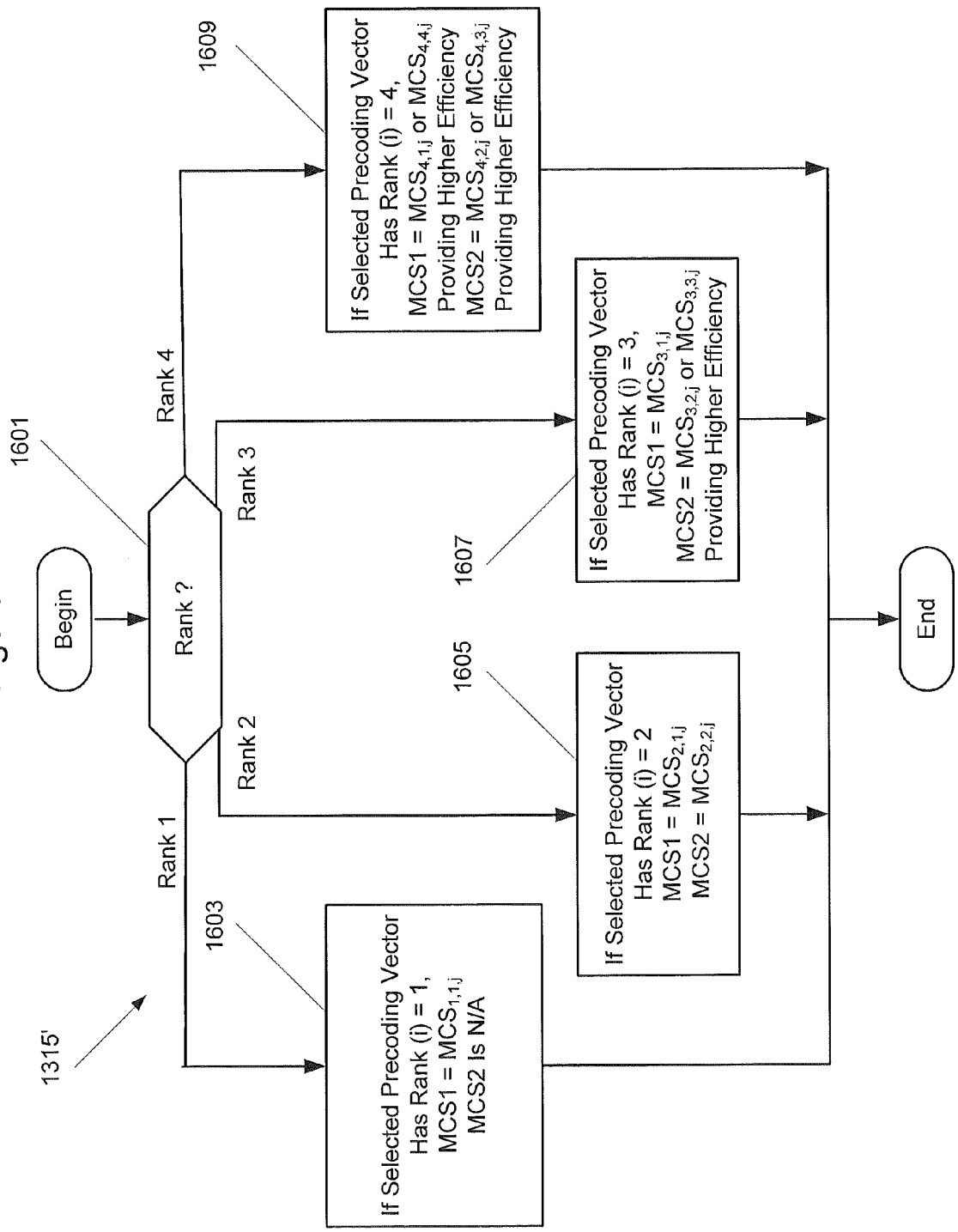
FIGS. 12A and 12B are flow charts illustrating operations of selecting modulation/coding schemes according to some embodiments of FIG. 10.

In FIG. 12A depending on the rank, processor 201 may select the modulation/coding scheme(s) using operations of blocks 1603, 1605, 1607, or 1609. For rank 1 precoding entities $P_{1,j}$ at block 1603, processor 101 may select a modulation/coding scheme MCS1=$M_{1,1,j}$ from FIG. 13A (corresponding to the selected precoding entity $P_{i,j}$) that is mapped to one MIMO transmission/reception layer (e.g., including CE1, IM1, DM1, and/or CD1). For rank 2 precoding entities $P_{2,j}$ at block 1605, processor 101 may select a first modulation/coding scheme MCS1=$M_{2,1,j}$ from FIG. 13B (corresponding to the selected precoding entity $P_{2,j}$) that is mapped to a first MIMO transmission/reception layer (e.g., including CE1, IM1, DM1, and/or CD1), and a second modulation/coding scheme MCS2=$M_{2,2,j}$ from FIG. 13B (corresponding to the selected precoding entity $P_{2,j}$) that is mapped to a second MIMO transmission/reception layer (e.g., including CE2, IM2, DM2, and/or CD2).

For rank 3 precoding entities $P_{3,j}$ at block 1607, processor 101 may select a first modulation/coding scheme MCS1= $M_{3,1,j}$ from FIG. 13B (corresponding to the selected precoding entity $P_{3,j}$) that is mapped to a first MIMO transmission/reception layer (e.g., including CE1, IM1, DM1, and/or CD1). In addition, processor 101 may select a second modulation/coding scheme MCS2 equal to $M_{3,2,j}$ or $M_{3,3,j}$ (corresponding to $P_{3,j}$) providing higher efficiency as indicated by corresponding layer efficiencies $E_{3,2,j}$ or $E_{3,3,j}$ from FIG. 14C. Moreover, the second modulation/coding scheme MCS2 for rank 3 may be mapped to second and third MIMO transmission/reception layers (e.g., including CE2, IM2, DM2, and/or CD2, and/or including CE3, IM3, DM3, and/or CD3).

For rank 4 precoding entities $P_{4,j}$ at block 1609, processor 101 may select a first modulation/coding scheme MCS1 equal to $M_{4,1,j}$ or $M_{4,4,j}$ (corresponding to $P_{4,j}$) providing higher efficiency as indicated by corresponding layer efficiencies $E_{4,1,j}$ or $E_{4,4,j}$ from FIG. 14D. Moreover, the first modulation/coding scheme MCS2 for rank 4 may be mapped to first and fourth MIMO transmission/reception layers (e.g., including CE1, IM1, DM1, and/or CD1, and/or including CE4, IM4, DM4, and/or CD4). In addition, processor 101 may select a second modulation/coding scheme MCS2 equal to $M_{4,2,j}$ or $M_{4,3,j}$ (corresponding to PO providing higher efficiency as indicated by corresponding layer efficiencies $E_{4,2,j}$ or $E_{4,3,j}$ from FIG. 14D. Moreover, the second modulation/coding scheme MC2 for rank 4 may be mapped to second and third MIMO transmission/reception layers (e.g., including CE2, IM2, DM2, and/or CD2, and/or including CE3, IM3, DM3, and/or CD3).

Figure 12B:
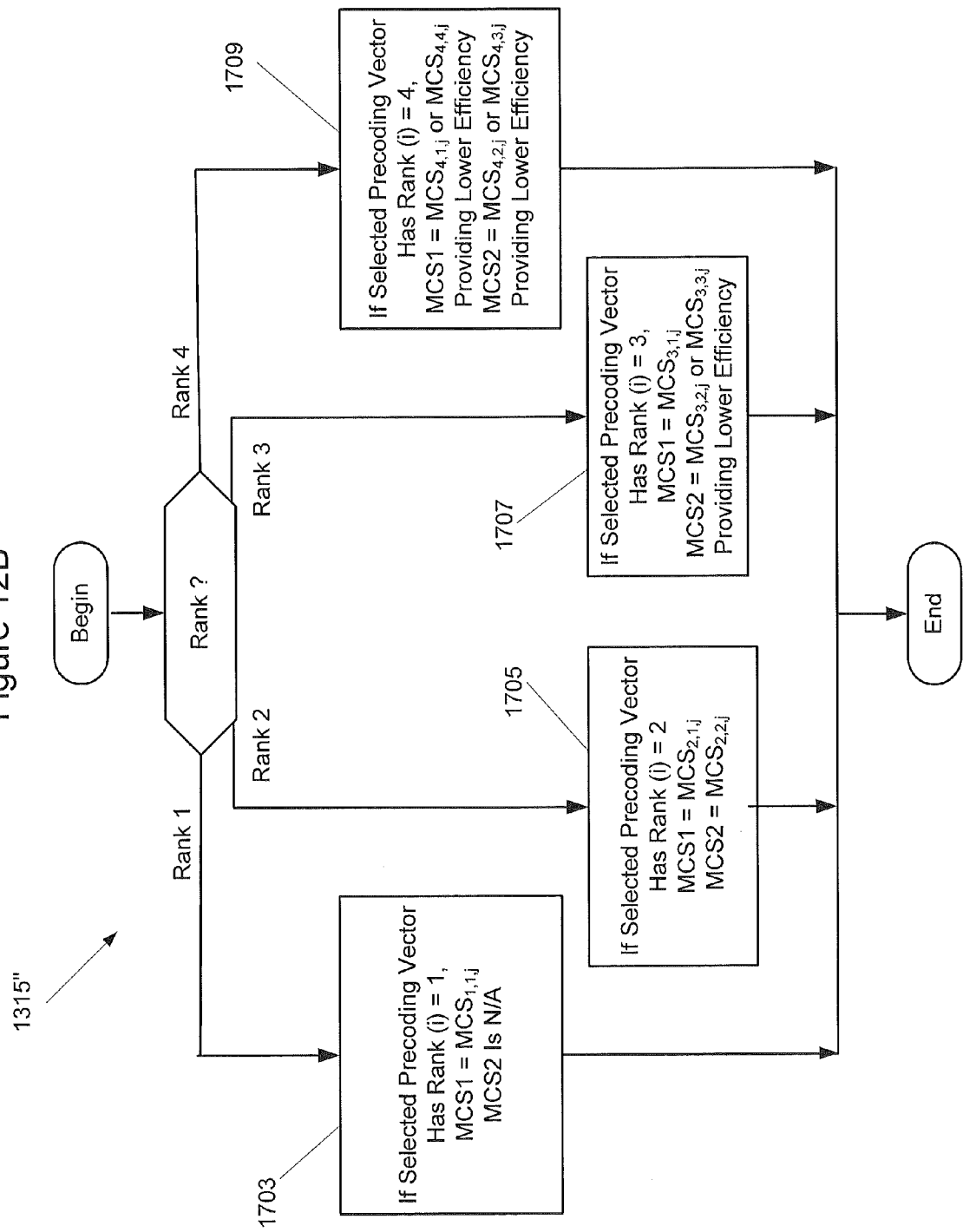

In FIG. 12B depending on the rank, processor 201 may select the modulation/coding scheme(s) using operations of blocks 1703, 1705, 1707, or 1709. For rank 1 precoding entities $P_{1,j}$ at block 1703, processor 101 may select a modulation/coding scheme MCS1=$M_{1,1,j}$ from FIG. 13A (corresponding to the selected precoding entity $P_{1,j}$) that is mapped to one MIMO transmission/reception layer (e.g., including CE1, IM1, DM1, and/or CD1). For rank 2 precoding entities $P_{2,j}$ at block 1705, processor 101 may select a first modulation/coding scheme MCS1=$M_{2,1,j}$ from FIG. 13B (corresponding to the selected precoding entity $P_{2,j}$) that is mapped to a first MIMO transmission/reception layer (e.g., including CE1, IM1, DM1, and/or CD1), and a second modulation/coding scheme MCS2=$M_{2,2,j}$ from FIG. 13B (corresponding to the selected precoding entity $P_{2,j}$) that is mapped to a second MIMO transmission/reception layer (e.g., including CE2, IM2, DM2, and/or CD2).

For rank 3 precoding entities $P_{3,j}$ at block 1707, processor 101 may select a first modulation/coding scheme MCS1= $M_{3,1,j}$ from FIG. 13B (corresponding to the selected precoding entity $P_{3,j}$) that is mapped to a first MIMO transmission/reception layer (e.g., including CE1, IM1, DM1, and/or CD1). In addition, processor 101 may select a second modulation/coding scheme MCS2 equal to $M_{3,2,j}$ or $M_{3,3,j}$ (corresponding to $P_{3,j}$) providing lower efficiency as indicated by corresponding layer efficiencies $E_{3,2,j}$ or $E_{3,3,j}$ from FIG. 14C. Moreover, the second modulation/coding scheme MCS2 for rank 3 may be mapped to second and third MIMO transmission/reception layers (e.g., including CE2, IM2, DM2, and/or CD2, and/or including CE3, IM3, DM3, and/or CD3).

For rank 4 precoding entities $M_{4,j}$ at block 1709, processor 101 may select a first modulation/coding scheme MCS1 equal to $M_{4,1,j}$ or $M_{4,4,j}$ (corresponding to $P_{4,j}$) providing lower efficiency as indicated by corresponding layer efficiencies $E_{4,1,j}$ or $E_{4,4,j}$ from FIG. 14D. Moreover, the first modulation/coding scheme MCS2 for rank 4 may be mapped to first and fourth MIMO transmission/reception layers (e.g., including CE1, IM1, DM1, and/or CD1, and/or including CE4, IM4, DM4, and/or CD4). In addition, processor 101 may select a second modulation/coding scheme MCS2 equal to $M_{4,2,j}$ or $M_{4,3,j}$ (corresponding to $P_{4,j}$) providing lower efficiency as indicated by corresponding layer efficiencies $E_{4,2,j}$ or $E_{4,3,j}$ from FIG. 14D. Moreover, the second modulation/coding scheme MCS2 for rank 4 may be mapped to second and third MIMO transmission/reception layers (e.g., including CE2, IM2, DM2, and/or CD2, and/or including CE3, IM3, DM3, and/or CD3).

The MIMO rank and precoding entity selected at block 1311 and the modulation/coding scheme(s) selected at block 1315 may then be included in channel quality information CQI that is transmitted to base station 100 at block 1105.

Various embodiments of the present invention are directed to methods and apparatus that determine channel quality information (CQI) for a 4 branch MIMO using fewer codewords for ranks greater than 2. In a conventional approach, one codeword is used for rank 1, two codewords are used for rank 2, 3 codewords are used for rank 3, and 4 codewords are used for rank 4. In contrast, in accordance with some embodiments of the present invention, one codeword is used for rank 1, while two codewords are used for ranks 2, 3, and 4. A potential problem can arise when only two codewords are used for rank 3 and 4, however this problem may be overcome/addressed using one or more of the following approaches to map signal to noise ratios (SNRs) for link adaptation.

Figures 17, 18:
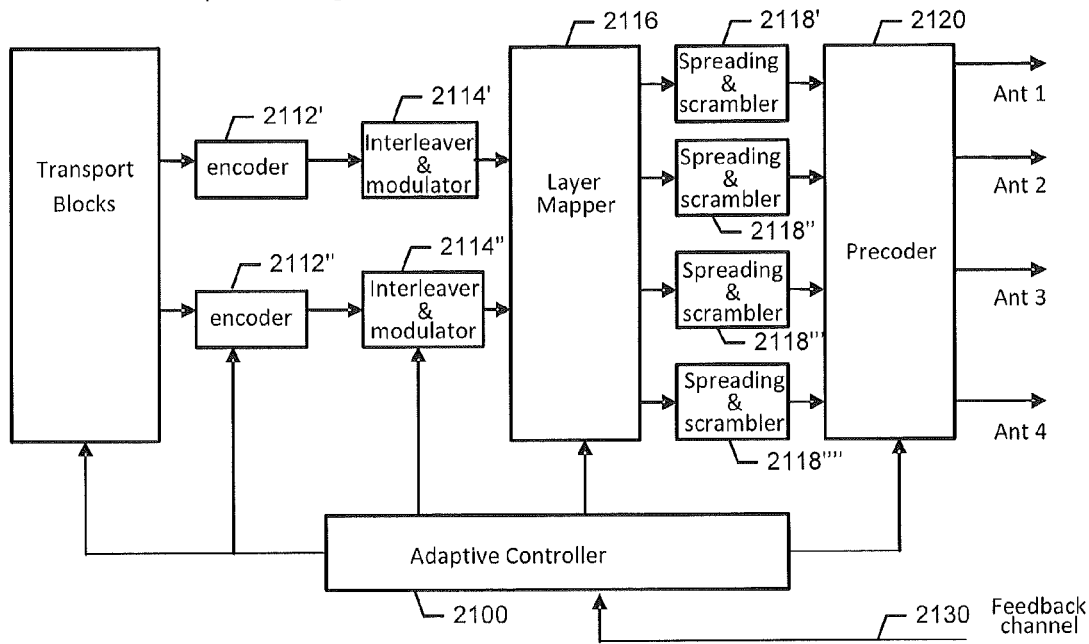
FIG. 17 is a block diagram illustrating elements/functionalities of base station processors according to some other embodiments of the present invention.
FIG. 18 is a table illustrating mappings of modulated codewords to downlink transmission layers according to some embodiments of the present invention.

Alternative embodiments of the base station (e.g., Evolved Node B, eNodeB) of FIG. 3 may support 4 transmit MIMO using 2 codewords (e.g., eliminating transport blocks TB3 and TB4, channel encoders CE3 and CE4, and interleavers/modulators IM3 and IM4) mapped to four symbol layers X1, X2, X3, and X4 as shown in FIG. 17. eNodeB is an acronym for an Evolved Universal Terrestrial Radio Access Network (E-UTRAN) NodeB. The network node receives feedback information on a feedback channel 2130 from a User Equipment node (UE), and an adaptive controller 2100 uses the feedback information to choose a transport block length, a modulation order and a coding rate. The adaptive controller 2100 also generates precoding weight information. In this non-limiting embodiment, the feedback information may corresponds to a maximum of 2 codewords. Based on a rank chosen by the adaptive controller 2100, transport blocks of equal size are bundled (for ranks 3 and 4) and passed to a pair of channel encoders 2112', 2112'' and the respective outputs thereof are interleaved and modulated by a pair of interleaver-modulators 2114', 2114''. Outputs of modulators 2114', 2114'' are mapped to the space time layers using layer mapper 2116. In this non-limiting embodiment, the layers may be mapped according to the table of FIG. 18 where $d^k(i)$ denotes the $i^{th}$ symbol at the output of the $k^{th}$ modulator 2114 and $x^i(i)$ denotes the $i^{th}$ symbol at the output of the $j^{th}$ layer and M denotes the maximum number of symbols supported per layer.

In this non-limiting embodiment, for ranks 1 and 2 the layer mapping is one to one. In contrast, for ranks 3 and 4 each codeword is mapped to more than one layer, such as illustrated in the table of FIG. 18. Following the layer mapping, the resultant symbols are spread and scrambled by a set of spreader and scramblers 2118'-2118''''. Precoding is applied by a precoder 2120 to the output of the spreader and scramblers 2118'-2118'''', and the resulting output signal is passed to the corresponding antenna ports (Ant 1, Ant 2, Ant 3, Ant 4).

The feedback channel 2130 provides channel quality information, such as a modulation and coding scheme that is suitable for use in a next Transmission Time Interval (TTI). The CQI report can also include rank information and a precoding control index (PCI).

One approach to choose these parameters may be provided as follows:
1. A UE computes the channel coefficients by estimating the channel;
2. The Signal to Noise Ration (SNR) is computed for each entity in the precoding codebook;
3. The capacity of each entity is computed using the following formula: C=log 2(1+SNR);
4. A PCI is determined that increases/maximizes capacity; and
5. With the corresponding SNR, link adaptation is performed to choose a modulation and coding scheme that is suitable for this SNR (e.g., using lookup tables).

For 4×4 MIMO with two codewords, and for ranks 3 and 4, for each precoding entity in the codebook, two modulation and coding indices are chosen by a UE from four received SNRs. Two approaches are described below which can be performed by a UE to choose suitable modulation and coding schemes as well as precoding and rank information for a 4×4 MIMO system with two codewords in accordance with various embodiments.

Figure 19:
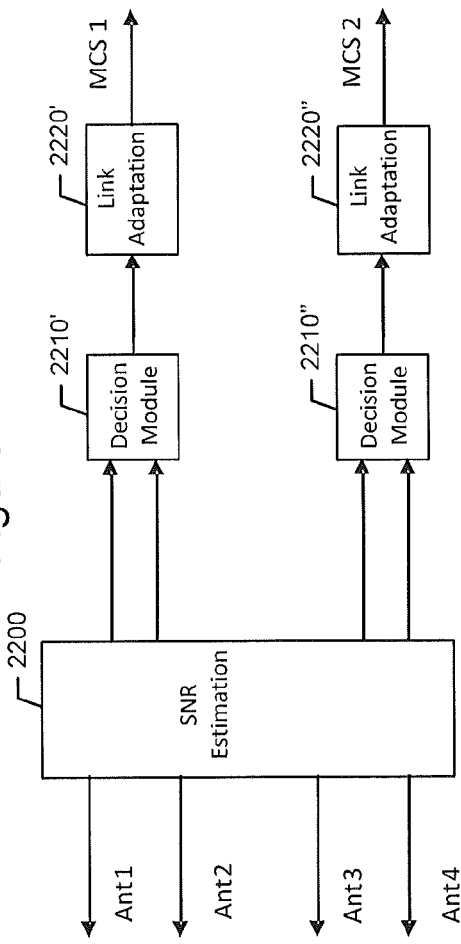
FIGS. 19 and 20 are block diagrams illustrating elements/functionalities of UE processors according to some embodiments of the present invention.

According to some embodiments, FIG. 19 shows a block diagram of a modulation and coding circuit of a UE that is configured to choose a modulation and coding scheme for a 4×4 MIMO system with two codewords according to some embodiments of the present invention. For ranks 1 and 2, computing the modulation and coding scheme may be performed according to a conventional method. However, for ranks 3 and 4, SNRs may be computed using SNR Estimator 2200 from the channel coefficient(s) and a defined precoding control index. The computed SNRs may be passed through a pair of decision modules 210', 210'' and respective link adaptation modules LAs 220', 220'' for computation of respective modulation and coding schemes MCS1, MCS2, which can be communicated to a base station via the feedback channel 2130 to control further transmission therefrom to the UE.

As shown in FIG. 19, each of the decision modules 2210', 2210'' may receive two SNRs which have been computed (estimated) by the SNR Estimator 200. Each decision module may combine the two SNRs to output a single SNR that is used by a corresponding link adaptation module. The decision module can combine the two SNRs into a single SNR by selecting: 1) a minimum of the input SNRs to generate an output SNR; 2) selecting a maximum of the input SNRs to generate an output SNR; 3) averaging the input SNRs to generate an output SNR; or 4) combining the input SNRs according to another defined algorithm to generate an output SNR. Each of the link adaptation modules 2220', 2220'' may use the respective SNR from the corresponding decision module 2210', 2210'' to choose a corresponding modulation and coding scheme (MCS1, MCS2) using, for example, a look up table of MCS entries that are referenced using the input SNR.

Further embodiments may combine one or more of the operations and methods of the first approach.

Figure 20:
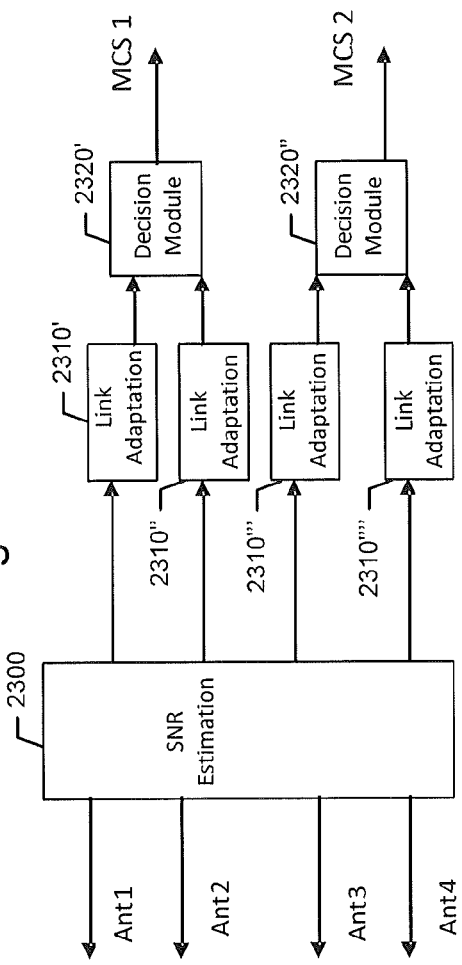

According to some other embodiments, FIG. 20 shows a block diagram of a modulation and coding circuit of a UE that is configured to choose a modulation and coding scheme. SNR Estimator 2300 may use channel coefficients to compute SNRs for each of the hypothesis (which may operate according to the SNR estimator of FIG. 19). SNR estimator 2300 may output four SNR estimate values. The link adaptation modules 2310', 2310'', 2310''', 2310'''' may each use a different one of the four SNRs to perform link adaptation to output a modulation and coding scheme. The link adaptation modules may operate in a conventional manner to select the modulation and coding scheme, such as using the input SNR as a pointer within a defined look up table of MCS entries. As shown in FIG. 20, each decision module 2320', 2320'' may combine two of the modulation and coding schemes output by a pair of the link adaptation modules 2310'-2310'', 2310'''-2310'''' to output a single modulation and coding scheme, which can be communicated to a base station via the feedback channel 2130 to control further transmission therefrom to the UE.

Thus, for example, the decision module 2320' may combine a modulation and coding scheme output by link adaptation modules 2310' and 2310'' into a single modulation and coding scheme MCS1, which is communicated to the base station via the feedback channel 2130. Similarly, the decision module 2320'' may combine a modulation and coding scheme output by link adaptation modules 2310''' and 2310'''' into a single modulation and coding scheme MCS2, which is communicated to the base station via the feedback channel 2130.

To combine the modulation and coding schemes, the decision modules 2320', 2320'' may each compute the spectral efficiency of different ones of an input pair of the modulation and coding scheme according to the following formula:

$$SE = \log 2(M)R,$$

where M is the number of constellation points in the selected modulation, and R is the code rate. The decision modules 2320', 2320'' may also compare the spectral efficiencies computed to output a modulation coding scheme MCS1, MCS2, respectively, that corresponds to:
1. Minimum spectral efficiency; and/or
2. Maximum spectral efficiency.

Figure 16:
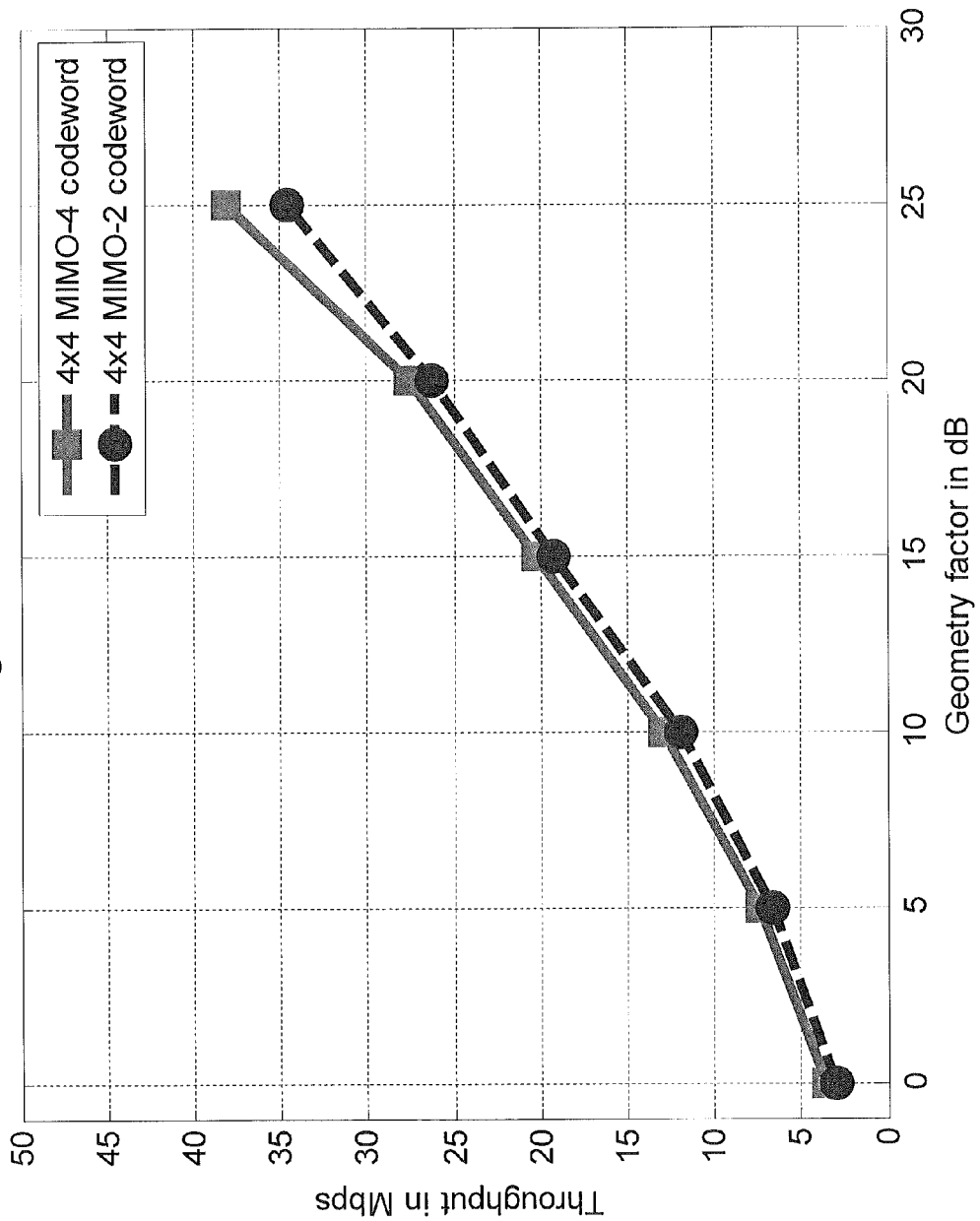
FIG. 16 is a graph illustrating link level performance of 4×4 MIMO downlink transmissions using 2 codewords and using 4 codewords.

FIG. 16 is a non-limiting example graph illustrating link level performance that may be obtained for a 4×4 MIMO system with 4 codewords (data points indicated with squares) and 2 codewords (data points indicated with circles) using various embodiments of the present invention. The user throughput in Mbps as a function of geometry factor (Îor/Ioc) in dB for the two approaches is illustrated. Significant gains may be obtained using 4×4 MIMO with 4 and 2 codewords as compared to 2×2 MIMO. For low geometries, performance with 2 codewords may be almost identical to that of 4 codewords, because at low geometries, there may be a relatively high probability that rank is either 1 or 2. For ranks 1 and 2, the approaches may have the same layer mapping. For higher geometries, performance with 4 codewords may be slightly better compared to that of 2 codewords. For example, at a geometry factor equal to 25 dB, user throughput gain of 9% may be observed for 4 codeword MIMO compared to that of 2 codeword MIMO. These computations assume perfect channel estimation and perfect link adaptation, and by adding imperfections it may be expected that the gains of 4 codeword may degrade compared to 2 codewords.

Some embodiments are directed to a method in a base station that communicates with a UE. The method may include receiving feedback information on a feedback channel from the UE. Transport blocks are encoded to form codewords which are mapped to space time layers based on ranks that are selected responsive to the feedback information. For ranks 1 and 2, each codeword is mapping to one space time layer. For ranks 3 and 4, each codeword is mapped to more than one space time layer.

In a further embodiment, the mapping of the transport blocks to the space time layers includes choosing a transport block length, a modulation order and a coding rate in response to the feedback information. In a further embodiment, when the selected rank is 3 or 4, the method further includes bundling the transport blocks, channel encoding the bundled transport blocks to generate the codewords, interleaving and modulating the encoded transport blocks to generate output codewords, and mapping the output codewords to the space time layers.

In a further embodiment, the feedback information corresponds to a maximum of 2 codewords. In a further embodiment, the space time layers can be mapped to the codewords according to the table of FIG. 18.

In a further embodiment, the feedback channel provides channel quality information for use in a next Transmission Time Interval (TTI). In a further embodiment, the channel quality information includes a modulation and coding scheme. In a further embodiment, in response to a 4×4 MIMO with two codewords and the selected rank being 3 or 4, the method further comprises choosing two modulation and coding indices from four received SNRs for each precoding entity in the codebook.

Another embodiment is directed to a User Equipment node (UE) that includes a modulation and coding circuit for a 4×4 MIMO system with two codewords. When a selected rank is 3 or 4, a SNR estimator computes SNR in response to a channel coefficient(s) and a defined precoding control index. The computed SNR is passed through a pair of decision modules and respective link adaptation modules which compute respective modulation and coding schemes.

In further embodiments, the SNR estimator outputs four SNRs, and each of the decision modules combines a different pair of the SNRs to output a single SNR to a corresponding one of the link adaptation modules for use in computing a modulation and coding scheme.

In further embodiments, each of the decision modules receives at least two SNRs from the SNR estimator, and combines the at least two SNRs into a single SNR by selecting: 1) a minimum of the input SNRs to generate an output SNR; 2) selecting a maximum of the input SNRs to generate an output SNR; 3) averaging the input SNRs to generate an output SNR; or 4) combining the input SNRs according to another defined algorithm to generate an output SNR. Each of the link adaptation modules choose a modulation and coding scheme in response to the SNR output from a different one of the decision modules.

Another embodiment is directed to a User Equipment node (UE) that includes a modulation and coding circuit that includes a SNR estimator that uses channel coefficients to compute the SNR for each of the hypothesis to output SNR values. Link adaptation modules respond to different ones of the SNR values to output modulation and coding schemes. Decision modules compute the spectral efficiency of different pairs of the modulation and coding schemes. In a further embodiment, the decision modules compute the spectral efficiency according to the following formula:

$$SE = \log 2(M)R;$$

where M is the number of constellation points in the selected modulation, and R is the code rate.

In a further embodiment, the SNR estimator outputs four SNR values which are input to different ones of four of the link adaptation modules. Each of the link adaptation modules select a modulation and coding scheme which is output. A pair of decision modules combines two of the modulation and coding schemes output from a different pair of the link adaptation modules to each output a single modulation and coding scheme.

In a further embodiment, each of the decision modules may compare the spectral efficiencies for each of the modulation and coding schemes received from the link adaptation modules to select between the modulation and coding schemes and/or to combine the modulation and coding schemes into a single modulation coding scheme that corresponds to a minimum spectral efficiency and/or a maximum spectral efficiency of the received modulation and coding schemes.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention.

That which is claimed is:

1. A method of operating a user equipment communicating with a base station of a radio access network, the method comprising:
   selecting a multiple-input-multiple-output, MIMO, rank and a MIMO precoding entity from a codebook of MIMO precoding entities for a downlink communication from the base station to the user equipment;
   selecting a modulation/coding scheme to be mapped to first and second MIMO layers of the downlink communication using the MIMO precoding entity; and
   communicating channel quality information identifying the MIMO precoding entity and the modulation/coding scheme from the user equipment to the base station.

2. The method according to claim 1 wherein the modulation/coding scheme comprises a first modulation/coding scheme, the method further comprising:
   responsive to selecting the MIMO precoding entity, selecting a second modulation/coding scheme to be mapped to a third MIMO layer of the downlink communication using the MIMO precoding entity, wherein the channel quality information includes the second modulation/coding scheme.

3. The method according to claim 1 wherein the modulation/coding scheme comprises a first modulation/coding scheme, the method further comprising:
responsive to selecting the MIMO precoding entity, selecting a second modulation/coding scheme to be mapped to third and fourth MIMO layers of the downlink communication using the MIMO precoding entity, wherein the channel quality information includes the second modulation/coding scheme.

4. The method according to claim 1 further comprising;
providing estimates of the downlink channel responsive to pilot signals received from the base station; and
estimating respective first and second signal strengths for the first and second layers of the MIMO precoding entity;
wherein selecting the modulation/coding scheme to be mapped to the first and second MIMO layers comprises selecting the modulation/coding scheme responsive to a function of first and second signal strengths for the first and second layers of the MIMO precoding entity.

5. The method according to claim 4 wherein selecting the modulation/coding scheme comprises selecting the modulation/coding scheme responsive to an average of the first and second signal strengths.

6. The method according to claim 4 wherein selecting the modulation/coding scheme comprises selecting the modulation/coding scheme responsive to a maximum of the first and second signal strengths.

7. The method according to claim 4 wherein selecting the modulation/coding scheme comprises selecting the modulation/coding scheme responsive to a minimum of the first and second signal strengths.

8. The method according to claim 1 further comprising:
providing channel estimates for a downlink channel from the base station to the user equipment;
estimating signal strengths for the MIMO layers for the precoding entities of the codebook using the channel estimates; and
estimating capacities for the precoding entities of the codebook using the signal strengths, wherein selecting the MIMO precoding entity comprises selecting the MIMO precoding entity responsive to the capacities;
wherein selecting the modulation/coding scheme to be mapped to the first and second MIMO layers comprises selecting the modulation/coding scheme responsive to a function of first and second signal strengths estimated for the first and second MIMO layers for the precoding entity using the channel estimates.

9. The method according to claim 8 wherein selecting the modulation/coding scheme comprises selecting the modulation/coding scheme responsive to an average of the first and second signal strengths, responsive to a maximum of the first and second signal strengths, and/or responsive to a minimum of the first and second signal strengths.

10. The method according to claim 1 further comprising;
selecting a respective modulation/coding scheme for each of the layers of each of the MIMO precoding entities of the codebook;
calculating a respective layer efficiency for each of the layers of each of the MIMO precoding entities of the codebook responsive to the respective modulation/coding schemes; and
providing a respective precoding entity efficiency for each of the MIMO precoding entities of the codebook responsive to the layer efficiencies of the respective MIMO precoding entities;
wherein selecting the MIMO precoding entity comprises selecting the MIMO precoding entity responsive to the precoding entity efficiencies.

11. The method of claim 10 wherein providing the respective precoding entity efficiency for the selected MIMO precoding entity comprises providing the respective precoding entity efficiency for the selected MIMO precoding entity responsive to a function of first and second layer efficiencies for the first and second MIMO layers of the selected MIMO precoding entity.

12. The method of claim 11 wherein providing the respective precoding entity efficiency for the selected MIMO precoding entity responsive to a function of first and second layer efficiencies comprises providing the respective precoding entity efficiency responsive to a maximum of the first and second layer efficiencies.

13. The method of claim 12 wherein selecting the modulation/coding scheme to be mapped to the first and second MIMO layers of the selected precoding entity comprises selecting one of a first modulation/coding scheme of the first layer of the selected MIMO precoding entity and a second modulation/coding scheme of the second layer of the selected MIMO precoding entity corresponding to the maximum of the first and second layer efficiencies.

14. The method of claim 11 wherein providing the respective precoding entity efficiency for the selected MIMO precoding entity responsive to a function of first and second layer efficiencies comprises providing the respective precoding entity efficiency responsive to a minimum of the first and second layer efficiencies.

15. The method of claim 14 wherein selecting the modulation/coding scheme to be mapped to the first and second MIMO layers of the selected precoding entity comprises selecting one of a first modulation/coding scheme of the first layer of the selected MIMO precoding entity and a second modulation/coding scheme of the second layer of the selected MIMO precoding entity corresponding to the minimum of the first and second layer efficiencies.

16. The method according to claim 10 further comprising:
providing estimates of the downlink channel responsive to pilot signals received from the base station; and
estimating a respective signal strength for each layer of each of the MIMO precoding entities of the codebook using the estimates of the downlink channel;
wherein selecting comprises selecting the respective modulation/coding scheme for each of the layers of each of the MIMO precoding entities of the codebook responsive to the respective signal strengths.

17. User equipment configured to communicate with a base station of a radio access network, the user equipment comprising:
a transceiver configured to receive communications from the base station and to transmit communications to the base station; and
a processor coupled to the transceiver, the processor being configured to select a multiple-input-multiple-output, MIMO, rank and a MIMO precoding entity from a codebook of MIMO precoding entities for a downlink communication from the base station to the user equipment, to select a modulation/coding scheme to be mapped to first and second MIMO layers of the downlink communication using the MIMO precoding entity, and to communicate channel quality information identifying the MIMO precoding entity and the modulation/coding scheme through the transceiver to the base station.

18. The user equipment of claim 17 wherein the processor is further configured to provide estimates of the downlink channel responsive to pilot signals received from the base station, to estimate respective first and second signal strengths for the first and second layers of the MIMO precoding entity, and to select the modulation/coding scheme to be mapped to the first and second MIMO layers responsive to a function of first and second signal strengths for the first and second layers of the MIMO precoding entity.

19. The user equipment of claim 17 wherein the processor is further configured to provide channel estimates for a downlink channel from the base station to the user equipment, to estimate signal strengths for the MIMO layers for the precoding entities of the codebook using the channel estimates, to estimate capacities for the precoding entities of the codebook using the signal strengths, to select the MIMO precoding entity responsive to the capacities, and to select the modulation/coding scheme to be mapped to the first and second MIMO layers responsive to a function of first and second signal strengths estimated for the first and second MIMO layers for the precoding entity using the channel estimates.

20. The user equipment of claim 17 wherein the processor is further configured to select a respective modulation/coding scheme for each of the layers of each of the MIMO precoding entities of the codebook, to calculate a respective layer efficiency for each of the layers of each of the MIMO precoding entities of the codebook responsive to the respective modulation/coding schemes, to provide a respective precoding entity efficiency for each of the MIMO precoding entities of the codebook responsive to the layer efficiencies of the respective MIMO precoding entities, and to select the MIMO precoding entity responsive to the precoding entity efficiencies.

* * * * *